(12) United States Patent
Liu

(10) Patent No.: US 12,113,849 B2
(45) Date of Patent: Oct. 8, 2024

(54) DATA PROCESSING METHOD, APPARATUS, AND DEVICE, BLOCKCHAIN SYSTEM, AND COMPUTER-READABLE STORAGE MEDIUM

(71) Applicant: Tencent Technology (Shenzhen) Company Limited, Shenzhen (CN)

(72) Inventor: Changhui Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 416 days.

(21) Appl. No.: 17/735,005

(22) Filed: May 2, 2022

(65) Prior Publication Data

US 2022/0263671 A1 Aug. 18, 2022

Related U.S. Application Data

(63) Continuation of application No. PCT/CN2021/092630, filed on May 10, 2021.

(30) Foreign Application Priority Data

May 22, 2020 (CN) .......................... 202010439186.6

(51) Int. Cl.
*H04L 67/10* (2022.01)
(52) U.S. Cl.
CPC .................................... *H04L 67/10* (2013.01)
(58) Field of Classification Search
None
See application file for complete search history.

(56) References Cited

U.S. PATENT DOCUMENTS 10,600,009 B1 * 3/2020 Augustine ............. H04L 9/0637
2019/0303541 A1 * 10/2019 Reddy ..................... G06F 21/64
(Continued)

FOREIGN PATENT DOCUMENTS

CN 106530083 A 3/2017
CN 109376187 A 2/2019
(Continued)

OTHER PUBLICATIONS

Abraham et al., "Qualified eID Derivation Into a Distributed Ledger Based IdM System", Aug. 1, 2018, IEEE, 2018 17th IEEE International Conference on Trust, Security and Privacy in Computing and Communications/ 12th IEEE International Conference on Big Data Science and Engineering,2018, pp. 1406-1414 (Year: 2018).*
(Continued)

*Primary Examiner* — Davoud A Zand
(74) *Attorney, Agent, or Firm* — Morgan, Lewis & Bockius LLP

(57) ABSTRACT

Embodiments of this application provide a data processing method, apparatus, and device, a blockchain system, and a computer-readable storage medium. The method is performed by a computer device acting as a blockchain client of the blockchain system, the method including: transmitting an identity query request to an identity chain node, the identity query request including an identity identifier (ID) of the blockchain client and to-be-processed data; receiving node identity information returned by the identity chain node based on the identity ID and the data; determining, according to the node identity information, a target blockchain node configured to process the data within a blockchain node set; transmitting the data ID to the target blockchain node, to query data on at least one of the plurality of application chains based on the data ID through the target
(Continued)

blockchain node; and receiving the queried data returned by the target blockchain node.

20 Claims, 12 Drawing Sheets

(56) References Cited

U.S. PATENT DOCUMENTS

| | | | | |
|---|---|---|---|---|
| 2020/0034395 | A1* | 1/2020 | Lu | H04L 9/3239 |
| 2020/0050690 | A1* | 2/2020 | Gaur | H04L 9/50 |

FOREIGN PATENT DOCUMENTS

| | | |
|---|---|---|
| CN | 110689434 A | 1/2020 |
| CN | 111145850 A | 5/2020 |
| CN | 111353175 A | 6/2020 |

OTHER PUBLICATIONS

Tencent Technology, ISR, PCT/CN2021/092630, Jul. 28, 2021, 3 pgs.

Yongxin Liu, "Market Failure and Government Adjustment in the Development of Bloc Chain Economy—Take Bloc Chain Application Practice in Guiyang City for Example", Journal of Shanghai Lixin University of Accounting and Finance, No. 3, Series No. 141, Dec. 31, 2017, 9 pgs.

Xiuxia Tian et al., "Community Distributed Power Security Transaction Scheme Based on Blockchain", College of Computer Science and Technology, Shanghai University of Electric Power, Dec. 31, 2019, 8 pgs.

Tencent Technology, WO, PCT/CN2021/092630, Jul. 28, 2021, 5 pgs.

Tencent Technology, IPRP, PCT/CN2021/092630, Nov. 17, 2022, 6 pgs.

* cited by examiner

DATA PROCESSING METHOD, APPARATUS, AND DEVICE, BLOCKCHAIN SYSTEM, AND COMPUTER-READABLE STORAGE MEDIUM

CROSS-REFERENCE TO RELATED APPLICATIONS

This application is a continuation application of PCT Patent Application No. PCT/CN2021/092630, entitled "DATA PROCESSING METHOD, APPARATUS AND DEVICE, BLOCKCHAIN SYSTEM, AND COMPUTER READABLE STORAGE MEDIUM" filed on May 10, 2021, which claims priority to Chinese Patent Application No. 202010439186.6, filed with the State Intellectual Property Office of the People's Republic of China on May 22, 2020, and entitled "DATA PROCESSING METHOD, DEVICE AND EQUIPMENT, BLOCKCHAIN SYSTEM AND STORAGE MEDIUM", all of which are incorporated herein by reference in their entirety.

FIELD OF THE TECHNOLOGY

This application relates to the field of blockchain technologies, and relates to, but is not limited to, a data processing method, apparatus, and device, a blockchain system, and a computer-readable storage medium.

BACKGROUND OF THE DISCLOSURE

Currently, in an era of informationization, there is a massive growth in data, and the data gathers together to form a large quantity of data centers. These data centers belong to different enterprises or departments, thereby forming isolated data islands, which results in ineffective transmission of information and difficulty in putting the due value of the information into play. The blockchain technology integrates technologies such as cryptography and distributed databases, and can effectively and securely solve a problem of cross-organizational data sharing. The current lack of a unified and interconnected communication mechanism between blockchain applications of different services greatly limits data sharing and the free flow of value.

A cross-chain interoperation can promote inter-chain collaboration, is a strong driver for the blockchain to develop toward network effects on a large scale, and gradually becomes a new hot spot for application demands. Currently, the cross-chain interoperation technology mainly includes hash locking, notary schemes, and sidechain/relay technologies.

However, the cross-chain interoperation technology in the related art is mainly applicable to the field of public chains, and it is necessary to mortgage digital tokens to solve the trust problem between different chains. Therefore, the cross-chain interoperation technology in the related art still has the inter-chain trust problem, and cannot guarantee trusted data transmission between different blockchains.

SUMMARY

In view of this, embodiments of this application provide a data processing method, apparatus, and device, a blockchain system, and a computer-readable storage medium. A trusted identity service is provided to a blockchain client through an identity chain node, and node identity information is returned to the blockchain client, so that the blockchain client can process data based on the node identity information. Therefore, through the identity chain node, a data processing process between different roles such as owners, administrators and visitors of the data is unblocked, and trusted data transmission between different blockchains is guaranteed.

The technical solutions in the embodiments of this application are implemented as follows:

An embodiment of this application provides a data processing method, performed by a computer device acting as a blockchain client in a blockchain system, the blockchain system including an identity chain and a plurality of application chains, the identity chain being configured to provide an identity service for blockchain applications deployed on the application chains, and the method including: transmitting an identity query request used for querying node identity information to an identity chain node associated with the identity chain, the identity query request including an identity identifier (ID) of the blockchain client and a data ID of to-be-processed data; receiving the node identity information corresponding to the identity ID and the data ID returned by the identity chain node; determining, within a blockchain node set, a target blockchain node corresponding to the node identity information; transmitting the data ID to the target blockchain node, to query data on at least one of the plurality of application chains based on the data ID through the target blockchain node; and receiving the queried data returned by the target blockchain node.

An embodiment of this application provides a data processing method, performed by an identity chain node in a blockchain system, the blockchain system including an identity chain and a plurality of application chains, the identity chain being configured to provide an identity service for blockchain applications deployed on the application chains, the identity chain storing node identity information of a blockchain node, and the method including: receiving an identity query request transmitted by a blockchain client, the identity query request including an identity ID of the blockchain client and a data ID of to-be-processed data; querying, on the identity chain according to the identity ID, node identity information of a target blockchain node configured to process the data; and transmitting the node identity information to the blockchain client, to transmit, according to the node identity information, the data ID to the target blockchain node through the blockchain client, and process the data through the target blockchain node.

An embodiment of this application provides a data processing method, performed by a target blockchain node in a blockchain system, the blockchain system including an identity chain and a plurality of application chains, the identity chain being configured to provide an identity service for blockchain applications deployed on the application chains, the target blockchain node including at least a notary node and a data processing node, and the notary node being a node pre-registering an identity on an identity chain node, and the method including: receiving, by the notary node in the target blockchain node, a data ID of to-be-processed data transmitted by a blockchain client; transmitting, by the notary node, a proposal corresponding to the data to the data processing node; obtaining a simulation execution result returned by the data processing node after simulating and executing the proposal; and submitting the data ID of the data to the data processing node based on the simulation execution result, to implement a cross-chain interoperation between different application chains.

An embodiment of this application provides a blockchain system, including: at least one identity chain node and at least one blockchain node, the identity chain node being corresponding to an identity chain, and the blockchain node being corresponding to at least one application chain, the identity chain being configured to store identity information of a blockchain client and node identity information of a blockchain node on each application chain through the identity chain node, to provide an identity service for a blockchain application deployed on the application chain, and the application chain being configured to process, according to the node identity information provided by the identity chain, to-be-processed data transmitted by the blockchain client.

An embodiment of this application provides a data processing apparatus, deployed in a blockchain system, the blockchain system including an identity chain and a plurality of application chains, the identity chain being configured to provide an identity service for blockchain applications deployed on the application chains, and the apparatus including: a first transmission module, configured to transmit an identity query request used for querying node identity information to an identity chain node, the identity query request including an identity ID of a blockchain client and a data ID of to-be-processed data; a first receiving module, configured to receive the node identity information corresponding to the identity ID and the data ID returned by the identity chain node; a determining module, configured to determine, in a blockchain node set, a target blockchain node corresponding to the node identity information; and a second transmission module, configured to transmit the data ID to the target blockchain node, to process the data through the target blockchain node.

An embodiment of this application provides a data processing apparatus, deployed in a blockchain system, the blockchain system including an identity chain and a plurality of application chains, the identity chain being configured to provide an identity service for blockchain applications deployed on the application chains, and the apparatus including: a second receiving module, configured to receive an identity query request transmitted by a blockchain client, the identity query request including an identity ID of the blockchain client and a data ID of to-be-processed data; a query module, configured to query, on the identity chain according to the identity ID, node identity information of a target blockchain node configured to process the data; and a third transmission module, configured to transmit the node identity information to the blockchain client, to transmit, according to the node identity information, the data ID to the target blockchain node through the blockchain client, and process the data through the target blockchain node.

An embodiment of this application provides a computer program product or a computer program, the computer program product or the computer program including computer instructions, the computer instructions being stored in a computer-readable storage medium, a processor of a computer device reading the computer instructions from the computer-readable storage medium, and the processor being configured to execute the computer instructions, to perform the data processing method described above.

An embodiment of this application provides a data processing device, including: a memory, configured to store executable instructions; and a processor, configured to execute the executable instructions stored in the memory, to perform the data processing method described above.

An embodiment of this application provides a computer-readable storage medium, storing executable instructions, the executable instructions, when executed by a processor, causing the processor to perform the data processing method described above.

The embodiments of this application have the following beneficial effects: A blockchain client transmits an identity query request to an identity chain node, and receives node identity information of a target blockchain node configured to process to-be-processed data returned by the identity chain node based on the identity query request. That is, a trusted identity service is provided to the blockchain client through the identity chain node, and the node identity information is returned to the blockchain client, so that the blockchain client can process data based on the node identity information. Therefore, through the identity chain node, a data processing process between different roles such as the owners, administrators and visitors of the data is unblocked, and trusted data transmission between different blockchains is guaranteed.

DESCRIPTION OF EMBODIMENTS

Figure 1A:
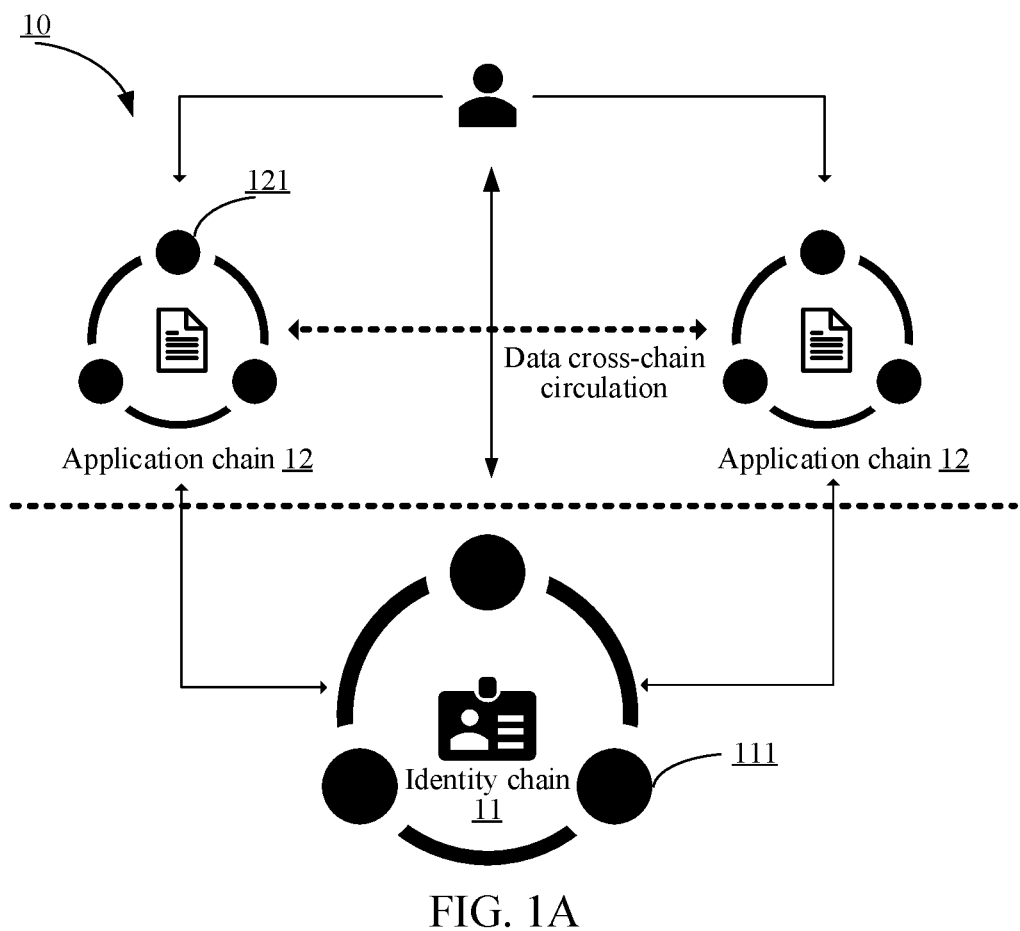
FIG. 1A is a schematic architectural diagram of a blockchain system for data processing according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments.

However, it is to be understood that the "some embodiments" may be the same subset or different subsets of all the possible embodiments, and may be combined with each other without conflict. Unless otherwise defined, meanings of all technical and scientific terms used in the embodiments of this application are the same as those usually understood by a person skilled in the art to which the embodiments of this application belong. Terms used in the embodiments of this application are merely intended to describe objectives of the embodiments of this application, but are not intended to limit this application.

For better understanding of the data processing method according to the embodiments of this application, a data processing method in the related art is described first:

In an era of informationization, there is a massive growth in data, and the data gathers together to form a large quantity of data centers. These data centers belong to different enterprises or departments, thereby forming isolated data islands, which results in ineffective transmission of information and difficulty in putting the due value of the information into play. Particularly, in the field of government affairs, where there is a large amount of scattered data and a large amount of private and sensitive information, it is unrealistic to build a centralized data sharing service, which further increases the risk of data tampering or leakage.

The blockchain technology integrates technologies such as cryptography and distributed databases, and can effectively and securely solve a problem of cross-organizational data sharing. However, thousands of data centers have respective data management modes. A single blockchain application can neither carry the current large-scale data volume nor meet diversified data management modes. Consequently, blockchain applications carrying corresponding data also vary, and have respective governance modes. Therefore, a compatible and inclusive system is required to integrate different blockchain applications into a unified service, to implement a barrier-free cross-chain service, and provide a hierarchical governance mode to meet management needs.

The current lack of a unified and interconnected communication mechanism between blockchain applications of different services greatly limits data sharing and the free flow of value. A cross-chain interoperation can promote inter-chain collaboration, is a strong driver for the blockchain to develop toward network effects on a large scale, and gradually becomes a new hot spot for application demands. Currently, the cross-chain interoperation technology mainly includes hash locking, notary schemes, and sidechain/relay technologies.

Hash locking: which implements a cross-chain transaction and information exchange by running a specific smart contract on two chains. For example, a user A generates a random number s, calculates a hash value h=hash (s) of the random number, and transmits the hash value to a user B. The users A and B lock respective assets sequentially through a smart contract. If B receives the correct s within the time of X, the smart contract automatically transfers the assets of B to A, or otherwise returns the assets to B. If A receives the random number s within the time of 2x, the assets of A are automatically transferred to B or otherwise returned to A.

Notary scheme: which is to elect one or more organizations as notaries to monitor events on a chain A automatically or on demand, and after a specified event occurs, to perform a corresponding action on a chain B to respond to the event. The notary group reaches a consensus on whether an event occurs through a specific consensus algorithm. The notary scheme is further divided into a centralized notary scheme (CNS) and a multi-sig notary scheme (MNS). The difference is that the latter uses the cryptography technology to randomly select some notaries from the notary group during each transaction verification, to jointly complete the issuance of signatures, thereby reducing the degree of dependence on the reliability of notaries.

Sidechain/Relay: which is based on the light client verification technology, that is, to execute a smart contract similar to the blockchain light client function on a chain B, and verify whether a particular transaction, event, or status information of a chain A occurs by verifying the cryptographic hash tree (CHT) and the block header of the chain A.

Currently, the cross-chain technology is still in the early stage of technological development, and there are mainly the following problems:

(1) Governance problem: The cross-chain technology is mainly applicable to the field of public chains. It is necessary to mortgage digital tokens to solve the trust problem between different chains. However, most consortium chains do not issue digital tokens. Therefore, the cross-chain technology is not applicable to the consortium chains in terms of governance.

(2) Generality problem: The cross-chain technology mainly focuses in the direction of the digital asset field. Types of messages transmitted across chains are only limited to assets. Therefore, general message types are not supported, and the application scenarios are relatively limited.

Based on at least one of the problems existing in the related art, the embodiments of this application provide a hierarchically interconnected blockchain system. The entire system can be divided into two layers. An underlying layer is a single identity main chain (that is, an identity chain), and an upper layer is a plurality of parallel application subchains (that is, application chains). Based on the blockchain technology, the identity chain provides a trusted identity service for upper-layer applications, and manages identities of individuals, devices, institutions, and application chains. The identity chain does not involve specific applications, but only focuses on providing unified identity issuance, authentication, and authorization for the upper-layer applications. As the infrastructure of the upper-layer applications, the identity chain has a simple function and a relatively simple governance mode compared with differentiated upper-layer applications. The upper-layer applications can build a large quantity of different blockchain application chains. All application chains use a unified identity service provided by the underlying identity chain. The application chain registers an identity on the underlying identity chain. The identity information includes an identity ID of the application chain, an identity public key, and an application programming interface (API) disclosed by the application chain. Therefore, verifiable interactions between different identity subjects are conducted through the identity information, providing a foundation of trust for cross-chain interworking. In the embodiments of this application, the verification process among different roles such as the owners, administrators, and visitors of the data is unblocked based on the identity chain, and a two-stage decentralized cross-chain interoperation scheme is provided, to achieve a flexible blockchain system capable of large-scale cross-chain interconnection, so that hierarchical governance of the system and secure and effective operations of data sharing are implemented.

Based on the blockchain system provided by the embodiments of this application, an embodiment of this application provides a data processing method, which can be applied to a blockchain client (that is, a client deployed on a node in any application chain), an identity chain node (that is, a node in any application chain different from the node that the blockchain client belongs to), or a blockchain node as an intermediate node. First, the blockchain client transmits an identity query request used for querying node identity information to an identity chain node, the identity query request including an identity ID of the blockchain client and a data ID of to-be-processed data; then receives the node identity information corresponding to the identity ID and the data ID returned by the identity chain node; determines, in a blockchain node set, a target blockchain node corresponding to the node identity information; and finally, transmits the data ID to the target blockchain node, to process the data through the target blockchain node. In this way, a trusted identity service is provided to the blockchain client through the identity chain node, and the node identity information is returned to the blockchain client, so that the blockchain client can process data based on the node identity information. Therefore, through the identity chain node, a data processing process between different roles such as the owners, administrators and visitors of the data is unblocked, and trusted data transmission between different blockchains is guaranteed.

FIG. 1A is a schematic architectural diagram of a blockchain system for data processing according to an embodiment of this application. To implement the data processing method of this embodiment of this application, as shown in FIG. 1A, the blockchain system 10 is a hierarchically interconnected blockchain system. The entire system can be divided into two layers. An underlying layer is an identity chain 11, and an upper layer is a plurality of parallel application chains 12.

The identity chain 11 corresponds to at least one identity chain node 111, and is configured to store identity information of a blockchain client and node identity information of a blockchain node 121 on each application chain through the identity chain node 111, to provide a trusted identity service for blockchain applications deployed on the application chains 12.

The blockchain applications deployed on the application chains 12 are upper-layer applications, and may be any application, such as anyone of an application related to payments and cash transactions, an application in the banking industry, a game application, a medical system application, or an instant messaging application.

The identity chain 11 provides a trusted identity service for the upper-layer applications based on the blockchain technology. The identity chain 11 can manage a variety of different types of identity data, including: personal identity data, device identity data, institution identity data, application chain identity data, or the like.

In some embodiments, the identity chain 11 may not involve specific applications, and the identity chain 11 only focuses on providing unified identity issuance, authentication, authorization, and query for the upper-layer applications. As the infrastructure of the upper-layer applications, the identity chain 11 has a simple function and a relatively simple governance mode compared with differentiated upper-layer applications, which is suitable for providing unified authorization and authentication functions for regulatory authorities.

The application chains 12 are configured to process to-be-processed data transmitted by the blockchain client according to the node identity information provided by the identity chain 11.

In this embodiment of this application, the upper-layer applications can build a large quantity of different blockchain application chains 12, and the application chains 12 may have respective service and blockchain governance modes. To connect isolated data islands between different application chains 12, all application chains 12 use a unified identity service provided by the underlying identity chain 11. The application chain 12 registers an identity on the underlying identity chain 11. The identity information includes an identity ID of the application chain 12, an identity public key, and an API disclosed by the application chain 12. Therefore, verifiable interactions between different identity subjects are conducted through the identity information, providing a foundation of trust for cross-chain interworking.

The blockchain system with high scalability provided in this embodiment of this application may be an enterprise-level blockchain system, applicable to the open consortium chain scenarios, involving the identity authentication, data authorization, or migration for serving public users. For example, it can be applied to the field of government affairs and people's livelihood, education field, or medical field. In the field of government affairs and people's livelihood, through the authorization of citizenship or corporate legal person identity, cross-regional and cross-departmental informatization collaboration is achieved, secure and verifiable digital certificates are provided, and the number of errands for certification is reduced. In the education field, a unified national education identity is issued, and digital education certificates and licenses such as files, transcripts, certificates of honor, and study certificates of associated students are issued based on the identity system, and cross-regional data circulation is achieved as the students go further education and transfer to other schools. In the medical field, cases and health data files controlled by users are managed, and cross-hospital and cross-service data authorization and migration are achieved, which not only improves efficiency, but also protects user privacy.

Figure 1B:
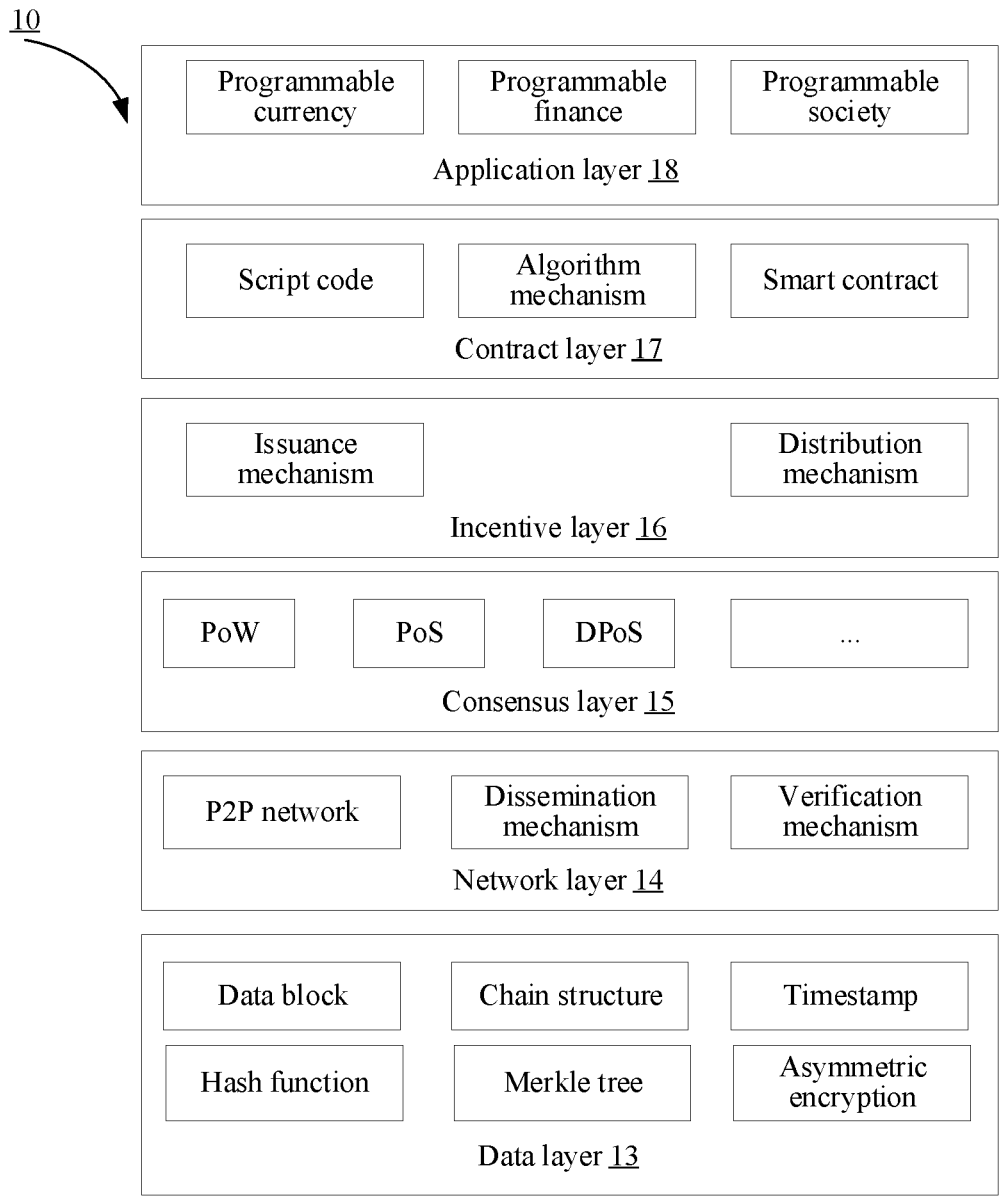
FIG. 1B is an architectural diagram of a blockchain system according to an embodiment of this application.

FIG. 1B is an architectural diagram of a blockchain system according to an embodiment of this application. As shown in FIG. 1B, the blockchain system 10 includes a data layer 13, a network layer 14, a consensus layer 15, an incentive layer 16, a contract layer 17, and an application layer 18.

The data layer 13 encapsulates a chain structure of an underlying data block, as well as related technologies such as the asymmetric public and private key data encryption and time stamping. The data layer 13 not only encapsulates the chain structure of an identity data block in the identity chain 11 (the identity data block refers to a data block formed by different types of identity data such as personal identity data, application identity data, device identity data, and institution identity data), but also encapsulates a chain structure of each application data block in the application chain 12 (the application data block refers to a data block formed by data related to various applications). The data layer 13 is the lowest data structure in the entire blockchain system. The network layer 14 includes a distributed networking mechanism, a data dissemination mechanism, a data verification mechanism, and the like. Due to the adoption of the peer-to-peer (P2P) networking technology, it means that the blockchain has the function of automatic networking. The consensus layer 15 mainly encapsulates various consensus mechanism algorithms of nodes in the blockchain system. The consensus mechanism algorithms are the core technology of the blockchain technology, because it determines who is exactly responsible for accounting, and a manner of selecting an accountant will affect the security and reliability of the entire system. The incentive layer 16 integrates economic factors into the blockchain technology system, mainly including an issuance mechanism and a distribution mechanism of economic incentives. The incentive mechanism is often a game mechanism, so that more nodes that abide by the rules are willing to keep accounts. The contract layer 17 mainly encapsulates various scripts, algorithms, and smart contracts, and is the basis of the programmable characteristics of the blockchain. The application layer 18 encapsulates various application scenarios and cases of the blockchain. For example, various blockchain applications built on Ethereum are deployed in the application layer, and the so-called programmable currency and programmable finance will also be built in the application layer. The data layer, the network layer, and the consensus layer are necessary factors for building a blockchain application, or otherwise it will not be called a blockchain in the true sense. However, the incentive layer, the contract layer, and the application layer are not necessary factors for each blockchain application, and some blockchain applications do not completely include the three-layer structure.

Figure 2A:
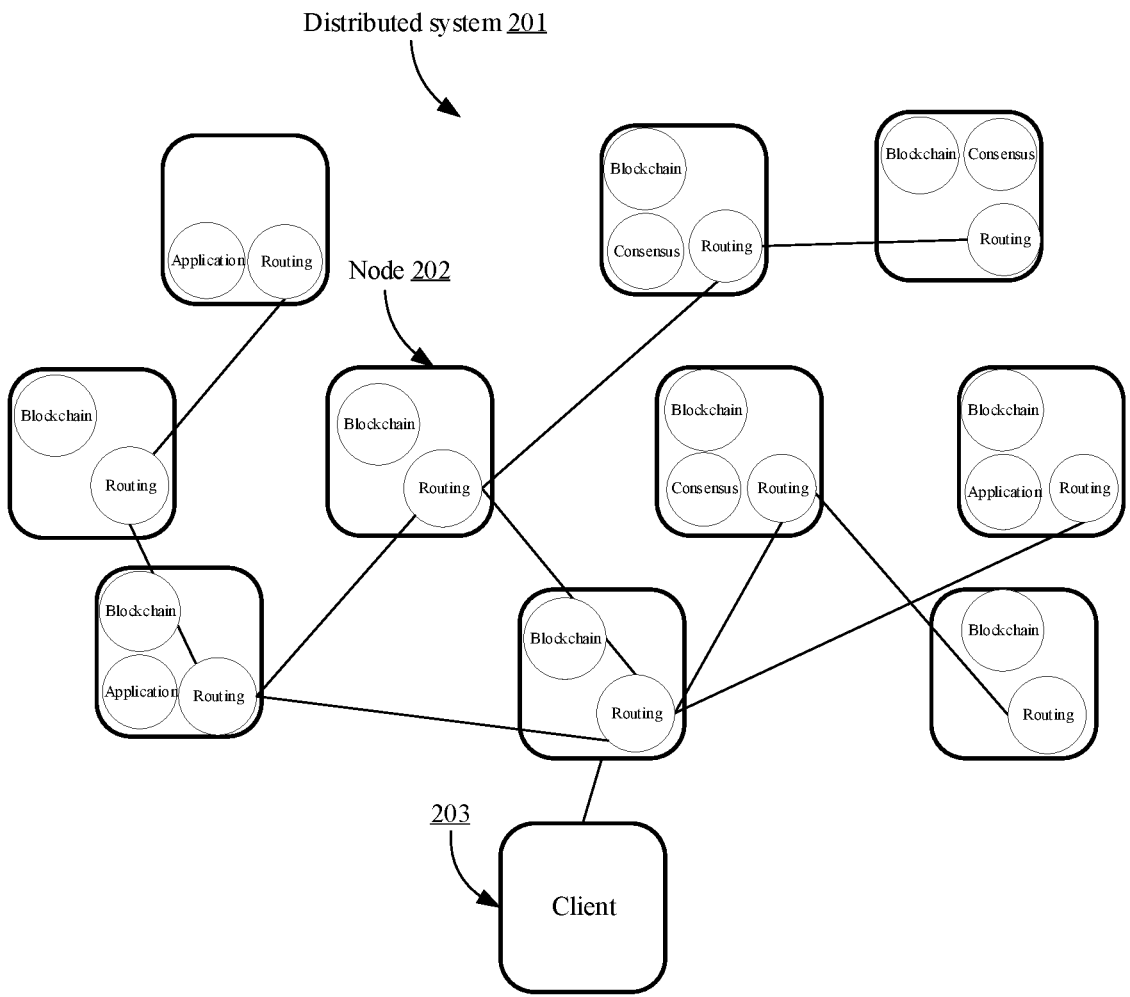
FIG. 2A is a schematic structural diagram of a distributed system according to an embodiment of this application.

In some embodiments, the blockchain system 10 may alternatively be a distributed system 201 of the blockchain system. FIG. 2A is a schematic structural diagram of a distributed system according to an embodiment of this application. The distributed system 201 may be a distributed node formed by a plurality of nodes 202 (computing devices in any form in an access network, such as servers and user terminals) and a client 203. A P2P network is formed between the nodes. The P2P protocol is an application-layer protocol running over the Transmission Control Protocol (TCP). Any machine such as a server or a terminal may be added to the distributed system to become a node. The nodes include a hardware layer, an intermediate layer, an operating system layer, and an application layer.

The node 202 in the distributed system 201 may be an identity chain node corresponding to the identity chain 11, or may be a blockchain node corresponding to the application chain 12. That is, when the node 202 is the identity chain node corresponding to the identity chain 11, the node 202 may be configured to issue, authenticate, authorize, and query identity information of any individual, any blockchain node, or any organization. In a case that the node 202 is the blockchain node corresponding to the application chain 12, the node 202 may be configured to process to-be-processed data.

Referring to functions of nodes in the blockchain system shown in FIG. 2A, the functions involved in the nodes in the blockchain system are described in detail below:

(1) Routing: which is a basic function of a node, and is used for supporting communication between nodes. In addition to the routing function, a node may also have the following functions: (2) Application: which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain system, so that the another node adds the recorded data to a temporary block when successfully verifying a source and integrity of the recorded data. For example, services implemented by the application include: (2.1) Wallet: which is used for providing a transaction function with electronic currency, including transaction initiation (that is, a transaction record of a current transaction is transmitted to another node in the blockchain system, and the another node stores, after successfully verifying the transaction record, recorded data of the transaction to a temporary block in a blockchain in response to admitting that the transaction is valid). Certainly, the wallet further supports querying for remaining electronic currency in an electronic currency address. (2.2) Shared ledger: which is used for providing functions of operations such as storage, query, and modification of account data. Recorded data of the operations on the account data is transmitted to another node in the blockchain system. The another node stores, after verifying that the account data is valid, the recorded data to a temporary block in response to admitting that the account data is valid, and may further transmit an acknowledgment to a node initiating the operations. (2.3) Smart contract: which is a computerized protocol, may be used for executing conditions of a contract, and is implemented by using code that is deployed in the shared ledger and that is executed when a condition is satisfied. The code is used for completing, according to an actual service requirement, an automated transaction, for example, querying a delivery status of goods purchased by a purchaser, and transferring electronic currency of the purchaser to an address of a merchant after the purchaser signs for the goods. Certainly, the smart contract is not limited only to a contract used for executing a transaction, and may be further a contract used for processing received information. (3) Blockchain: which includes a series of blocks that are consecutive in a chronological order of generation. Once a new block is added to the blockchain, the new block is no longer removed. The block records recorded data submitted by the node in the blockchain system. (4) A consensus is a process in the blockchain network, and is used for reaching consistency in transactions in blocks among a plurality of related nodes, and the consistent blocks are appended to a tail of the blockchain. A mechanism for reaching the consensus includes a proof of work (PoW), a proof of stake (PoS), a delegated proof of stake (DPoS), a proof of elapsed time (PoET), or the like.

Figure 2B:
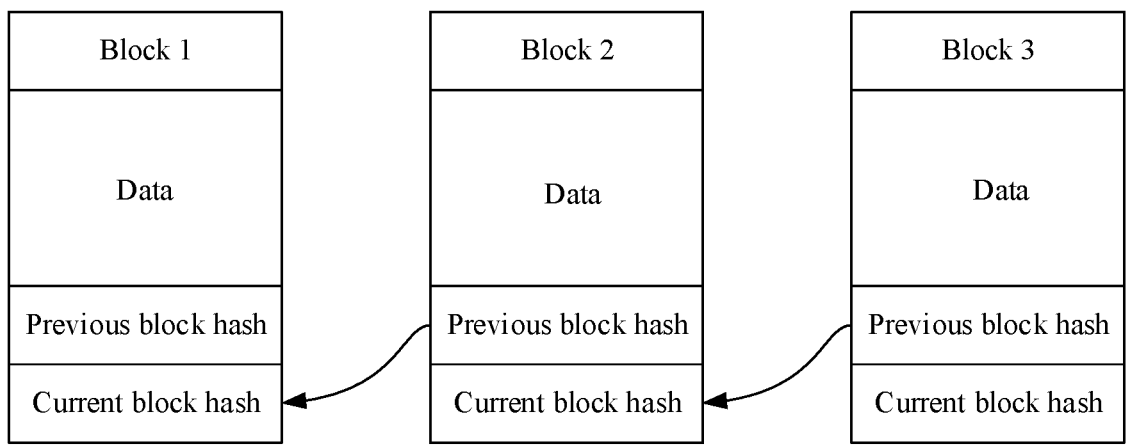
FIG. 2B is a schematic diagram of a block structure according to an embodiment of this application.

FIG. 2B is a schematic diagram of a block structure according to an embodiment of this application. Each block includes a hash value of a transaction record stored in the current block (a hash value of the current block) and a hash value of a previous block. Blocks are connected according to hash values to form a blockchain. In addition, the block may further include information such as a timestamp indicating a block generation time. A blockchain is a decentralized database essentially, and is a series of associated data blocks generated by using a cryptographic method. Each data block includes related information, and is configured to verify the validity (anti-counterfeiting) of the information of the data block, and generate a next block.

Exemplary applications of a data processing device provided in the embodiments of this application are described below. The data processing device provided in the embodiments of this application may be implemented as any node 202 in the blockchain system. The node 202 may be any terminal with a screen display function, for example, a notebook computer, a tablet computer, a desktop computer, a mobile device (for example, a mobile phone, a portable music player, a personal digital assistant, a dedicated messaging device, or a portable game device), a smart robot, an in-vehicle computer, a wearable electronic device, a smart home, or a VR/AR device, or may be a server. An exemplary application when the data processing device is implemented as the node 202 is described below.

Figure 3:
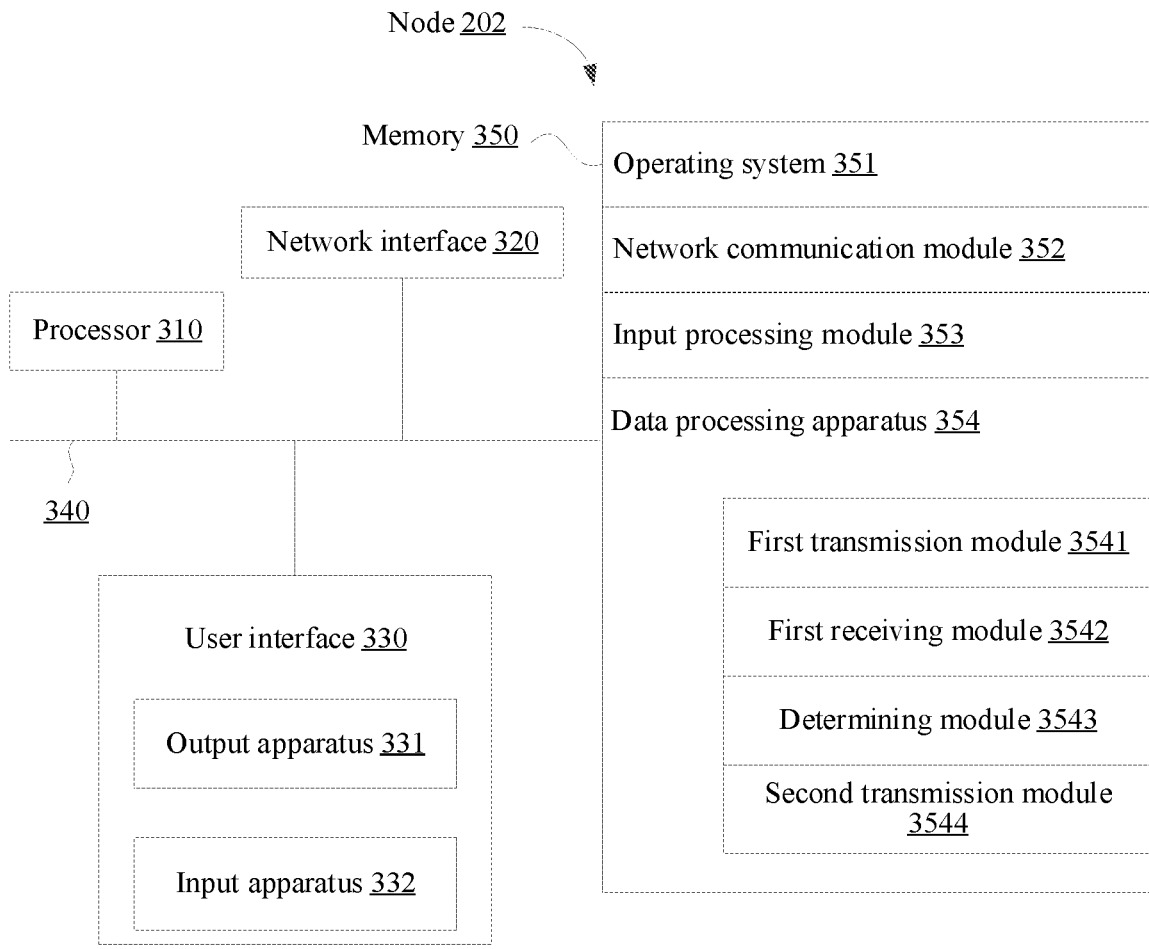
FIG. 3 is a schematic structural diagram of a node according to an embodiment of this application.

Referring to FIG. 3, which is a schematic structural diagram of a node according to an embodiment of this application, the node 202 shown in FIG. 3 includes: at least one processor 310, a memory 350, at least one network interface 320, and a user interface 330. All components in the node 202 are coupled together by a bus system 340. It may be understood that the bus system 340 is configured to implement connection and communication between the components. In addition to a data bus, the bus system 340 further includes a power bus, a control bus, and a status signal bus. However, for ease of clear description, all types of buses are marked as the bus system 340 in FIG. 3.

The processor 310 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 330 includes one or more output apparatuses 331 that can display media content, including at least one of one or more speakers and one or more visual display screens. The user interface 330 further includes one or more input apparatuses 332, including user interface components that facilitate inputting of a user, such as a keyboard, a mouse, a microphone, a touch display screen, a camera, or another input button and control.

The memory 350 may be a removable memory, a non-removable memory, or a combination thereof. Exemplary hardware devices include a solid-state memory, a hard disk drive, an optical disc drive, or the like. The memory 350 includes one or more storage devices physically away from the processor 310. The memory 350 includes a volatile memory or a non-transitory memory, or may include both a volatile memory and a non-transitory memory. The non-transitory memory may be a read-only memory (ROM). The volatile memory may be a random access memory (RAM). The memory 350 described in this embodiment of this application is to include any other suitable type of memories. In some embodiments, the memory 350 may store data to support various operations. Examples of the data include a program, a module, and a data structure, or a subset or a superset thereof, which are described below by using examples.

An operating system 351 includes a system program configured to process various basic system services and perform a hardware-related task, such as a framework layer, a core library layer, or a driver layer, and is configured to implement various basic services and process a hardware-based task.

A network communication module 352 is configured to reach another computing device through one or more (wired or wireless) network interfaces 320. Exemplary network interfaces 320 include: Bluetooth, wireless compatible authentication (Wi-Fi), a universal serial bus (USB), or the like.

An input processing module 353 is configured to detect one or more user inputs or interactions from one of the one or more input apparatuses 332 and translate the detected inputs or interactions.

In some embodiments, the apparatus provided in this embodiment of this application may be implemented by using software. FIG. 3 shows a data processing apparatus 354 stored in the memory 350. The data processing apparatus 354 may be a data processing apparatus in the node 202, may be software in a form such as a program and a plug-in, and includes the following software modules: a first transmission module 3541, a first receiving module 3542, a determining module 3543, and a second transmission module 3544. These modules are logical modules, and therefore can be randomly combined or further divided based on a function to be implemented. A function of each module is described below.

In some other embodiments, the data processing apparatus 354 may alternatively be a data processing apparatus in another node 202, may be software in a form such as a program and a plug-in, and includes the following software modules (not shown in the figure): a second receiving module, a query module, and a third transmission module. These modules are logical modules, and therefore can be randomly combined or further divided based on a function to be implemented.

In still some other embodiments, the data processing apparatus 354 may alternatively be a data processing apparatus in still another node 202, which may be software in a form such as a program and a plug-in, and includes the following software modules (not shown in the figure): a third receiving module, an obtaining module, a fourth transmission module, a fourth receiving module, and a fifth transmission module. These modules are logical modules, and therefore can be randomly combined or further divided based on a function to be implemented.

In yet some other embodiments, the apparatus provided in this embodiment of this application may be implemented by using hardware. For example, the apparatus provided in this embodiment of this application may be a processor in a form of a hardware decoding processor, programmed to perform the data processing method provided in the embodiments of this application. For example, the processor in the form of a hardware decoding processor may use one or more application-specific integrated circuits (ASIC), a DSP, a PLD, a complex programmable logic device (CPLD), a field-programmable gate array (FPGA), or another electronic element.

In this application, a cloud technology may alternatively be used for implementing the data processing method. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, or an application technology based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have a respective ID in the future and needs to be transmitted to a background system for logical processing. Data at different levels is separately processed, and data in various industries requires strong system support, which can only be implemented through cloud computing.

In some embodiments, the process of storing to-be-processed data may be implemented by using the cloud storage technology. The cloud storage is a new concept extended and developed on the concept of the cloud computing. The distributed cloud storage system refers to a storage system integrating a large quantity of different types of storage devices (the storage devices are also referred to as storage nodes) in the network to collaborate through application software or application interfaces through the cluster application, grid technology, distributed storage file system, or another function, and jointly providing data storage and service access functions to the outside.

In some other embodiments, the solution for querying the data may be implemented by using a database in the cloud technology. The database, in short, may be considered as an electronic file cabinet, that is, a place for storing electronic files, and users can add, query, update, or perform another operation on the data in the files. The so-called "database" is a data set that is stored together in a particular manner and can be shared with a plurality of users, has as little redundancy as possible, and is independent of an application.

Figure 4:
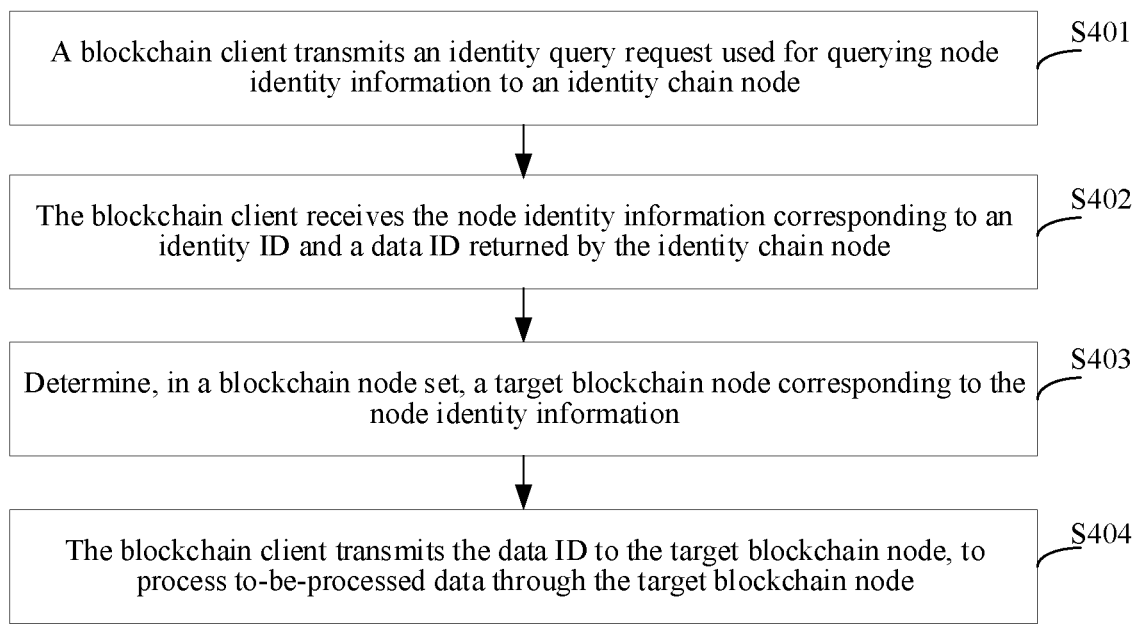
FIG. 4 is a schematic flowchart of a data processing method according to an embodiment of this application.

The data processing method provided in this embodiment of this application is described below with reference to an exemplary application and implementation of the node 202 provided in this embodiment of this application. FIG. 4 is a schematic flowchart of a data processing method according to an embodiment of this application, and the method is described with reference to steps shown in FIG. 4.

Step S401: A blockchain client transmits an identity query request used for querying node identity information to an identity chain node.

The blockchain client is deployed on any blockchain node in the blockchain system. The blockchain client may be a client of any type of application. For example, the blockchain client may be a client of a government affair department application (app), a client of a hospital app, or a client of a shopping app.

The identity query request includes an identity ID of the blockchain client and a data ID of to-be-processed data. The identity query request is used for querying node identity information of a blockchain node configured to process the data.

In this embodiment of this application, the identity ID of the blockchain client may not only be an application ID of an application corresponding to the blockchain client, but also a personal identity ID corresponding to a user account logged in on the blockchain client, a device ID of a terminal on which the blockchain client is located, or an institution identity ID corresponding to an account of an organization or institution logged in on the blockchain client. That is, the identity ID may be at least one of the following: a personal identity ID, an application ID, a device ID, and an institution ID. When a user logs in to a personal account on the blockchain client, a transmitted identity ID may be a personal identity ID of the user. When the blockchain client transmits the identity ID to the identity chain node based on a triggering operation of the user, the identity ID may include not only an application ID of an app corresponding to the blockchain client, but also the personal identity ID of the user, or may further include a device ID of a terminal device on which the blockchain client is deployed. When the user logs in to an account of an enterprise or institution on the blockchain client, a transmitted identity ID may be an institution ID.

In some embodiments, when transmitting the identity ID to the identity chain node, the blockchain client not only needs to transmit the personal identity ID of the user, but also needs to transmit at least one of the application ID of the app corresponding to the blockchain client and the device ID of the terminal on which the blockchain client is located. For example, medical record data of a user A in a hospital may be stored on the blockchain, and educational information of the user A is also stored on the blockchain. Then, when the user A queries the medical record data of the user A through an app of the medical system, the identity chain node needs to know whether the user A transmits an identity query request from the app of the medical system or transmits the identity query request from an app of the educational system. Therefore, the identity query request includes not only a personal identity ID of the user A, but also an application ID corresponding to the app of the medical system.

To-be-processed data may be data the user intends to query, data the user intends to store on the blockchain, or data the user intends to update. The to-be-processed data may be any type of data, including but not limited to, at least one of: text data, image data, video data, or audio data. The to-be-processed data may alternatively be data in any field, including but not limited to: data in the medical field, data in the education field, and data in the field of government affairs and people's livelihood, or the data may alternatively be information data for individuals, or information data for organizations and institutions. The to-be-processed data is not limited in this embodiment of this application.

Step S402: The blockchain client receives the node identity information corresponding to an identity ID and a data ID returned by the identity chain node.

The identity chain node corresponds to an identity chain. The identity chain stores identity information of the blockchain client and node identity information of each blockchain node. The identity information of the blockchain client includes at least the identity ID of the blockchain client. The identity chain is configured to provide a trusted identity service for the blockchain client. The identity chain node is configured to store the identity information of the blockchain client and the node identity information of each blockchain node, to form an identity chain. A blockchain node in a blockchain node set is configured to store blockchain data, to form at least one application chain.

In this embodiment of this application, the identity information of the blockchain client other than the identity ID may be queried from the identity chain through the identity ID of the blockchain client, for example, a client version number of the blockchain client, a function corresponding to the client version number, or other identity information. Certainly, in another embodiment, from the identity chain, the personal identity information of each user in the blockchain client may be further queried, and the node identity information of the blockchain node configured to process the data may be further queried.

In this embodiment of this application, after receiving the identity query request, the identity chain node queries, in response to the identity query request, the node identity information corresponding to the identity ID and the data ID in the identity chain.

The node identity information may be any type of identity information such as a link address of the blockchain node, or an ID of the blockchain node. The node identity information can make the blockchain node quickly locate a processing node of the data.

Step S403: Determine, in a blockchain node set, a target blockchain node corresponding to the node identity information.

In this embodiment of this application, the blockchain node in the blockchain node set corresponds to at least one application chain, and the application chain stores blockchain data. That is, in this embodiment of this application, the blockchain system may include one identity chain and a plurality of application chains, each application chain corresponds to the same application, and each application chain is configured to implement an arbitrary function corresponding to one application. For example, an application chain corresponding to a shopping app may not only implement a transaction between the seller and the buyer during a shopping process, but also implement the storage of transaction data and the analysis of the transaction amount.

The identity chain is configured to provide an identity service for blockchain applications deployed on the application chains, and the identity service may be any type of trusted identity service that is the same as or related to the issuance, authentication, authorization, and query of identities.

Step S404: The blockchain client transmits the data ID to the target blockchain node, to process to-be-processed data through the target blockchain node.

After the target blockchain node is determined, the data ID is transmitted to the target blockchain node. Then, the target blockchain node may obtain the data according to the data ID, and complete the processing of the data. For example, the data may be to-be-queried data. Then, after obtaining the data ID, the target blockchain node queries data corresponding to the data ID in the application chains, and returns the queried data to the blockchain client. Alternatively, the data may be data of a transaction to be done. Then, after obtaining the data ID (which may be a product ID), the target blockchain node queries data corresponding to the data ID (which may be the balance) in the application chains. If the data corresponds to application chain data of the buyer, a selling price of a corresponding product is subtracted from the balance. If the data corresponds to application chain data of the seller, the selling price of the corresponding product is added to the balance.

In the data processing method provided in this embodiment of this application, an identity query request is transmitted to an identity chain node, and node identity information of a target blockchain node configured to process to-be-processed data returned by the identity chain node based on the identity query request is received. That is, a trusted identity service is provided to the blockchain client through the identity chain node, and the node identity information is returned to the blockchain client, so that the blockchain client can process data based on the node identity information. Therefore, through the identity chain node, a data processing process between different roles such as the owners, administrators and visitors of the data is unblocked, and trusted data transmission between different blockchains is guaranteed.

Figure 5:
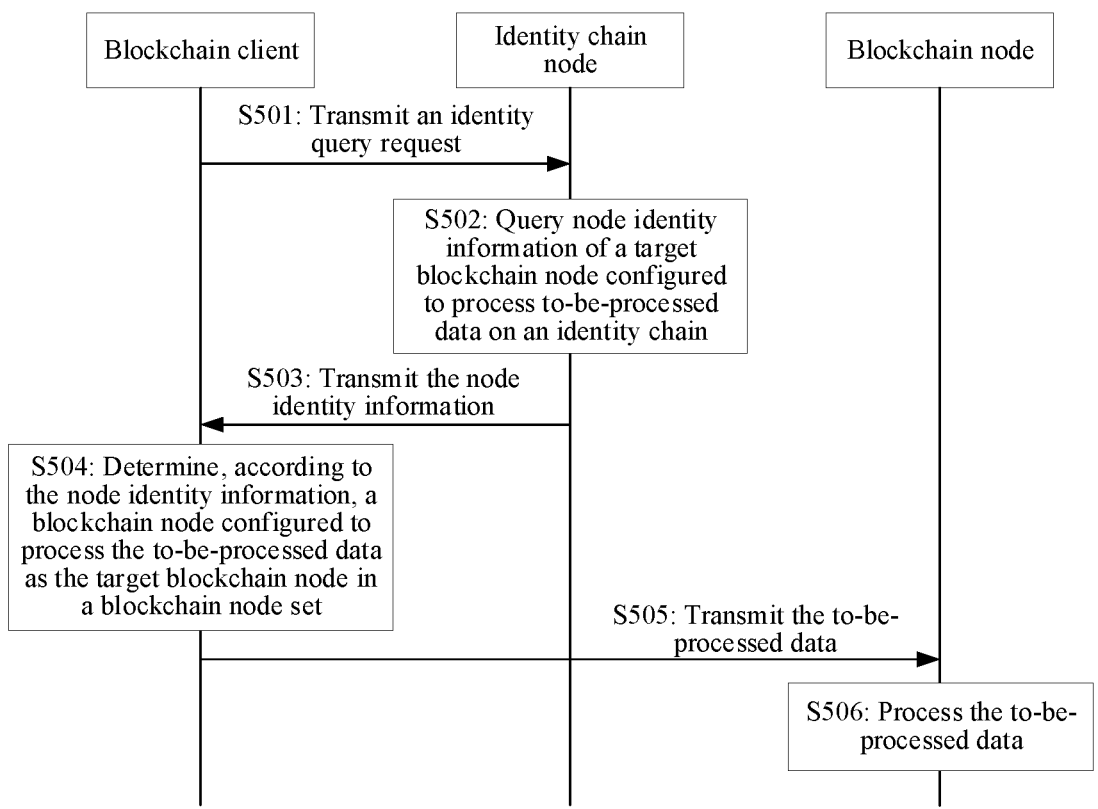
FIG. 5 is a schematic flowchart of a data processing method according to an embodiment of this application.

In some embodiments, the data processing method may be applied to a blockchain system. The blockchain system includes a blockchain client, an identity chain node, and a blockchain node (that is, a target blockchain node) configured to process data. FIG. 5 is a schematic flowchart of a data processing method according to an embodiment of this application. As shown in FIG. 5, the method includes the following steps:

Step S501: A blockchain client transmits an identity query request to an identity chain node. The identity query request includes an identity ID of the blockchain client and a data ID of to-be-processed data.

Step S502: The identity chain node queries, in response to the identity query request, node identity information of a target blockchain node configured to process to-be-processed data on an identity chain.

The identity chain stores node identity information of each blockchain node. When obtaining the identity query request, the identity chain node queries, according to the data ID in the identity query request, the node identity information of the target blockchain node configured to process the data. For example, the data ID of the data indicates that the data is educational information data of a certain student A. Then, the identity chain node queries a corresponding blockchain node storing the educational information data of the student A on the identity chain, and then transmits the node identity information of the blockchain node to the blockchain client.

In some embodiments, the identity query request may further include an ID of a to-be-queried target blockchain node. That is, the user knows in advance which blockchain node is to be queried, but the user does not have a link address of the blockchain node. Then, in this case, the identity chain node may directly transmit the link address of the target blockchain node as the above node identity information to the blockchain client.

In some embodiments, in the identity chain, blockchain nodes may be classified according to types of the blockchain nodes. For example, the types of the blockchain nodes include: blockchain nodes in the field of government affairs, blockchain nodes in the medical field, and blockchain nodes in the education field. Alternatively, the types of the blockchain nodes include shopping blockchain nodes, information blockchain nodes, and communication blockchain nodes. Correspondingly, the identity query request may further include a type of the blockchain node. In this way, the identity chain node may query, directly according to the type of the blockchain node, the corresponding target blockchain node in the identity chain.

Step S503: The identity chain node transmits the node identity information to the blockchain client.

Step S504: The blockchain client determines, according to the node identity information, a blockchain node configured to process the data in a blockchain node set as the target blockchain node.

The blockchain node set includes a plurality of blockchain nodes, each blockchain node corresponds to a piece of node identity information, and node identity information of each blockchain node is different from that of another blockchain node. Through the received node identity information, the corresponding target blockchain node can be directly determined in the blockchain node set.

Step S505: The blockchain client transmits the data to the determined target blockchain node (that is, the blockchain node in FIG. 5).

Step S506: The target blockchain node processes the data.

In the data processing method provided in this embodiment of this application, to-be-processed data is processed through a blockchain system formed by a blockchain client, an identity chain node, and a blockchain node configured to process data, an identity query request is transmitted to the identity chain node in the blockchain system, and node identity information of a target blockchain node configured to process to-be-processed data returned by the identity chain node based on the identity query request is received. That is, a trusted identity service is provided to the blockchain client through the identity chain node, and the node identity information is returned to the blockchain client, so that the blockchain client can process data based on the node identity information. Therefore, through the identity chain node, a data processing process between different roles such as the owners, administrators and visitors of the data is unblocked, and trusted data transmission between different blockchains is guaranteed.

Figure 6:
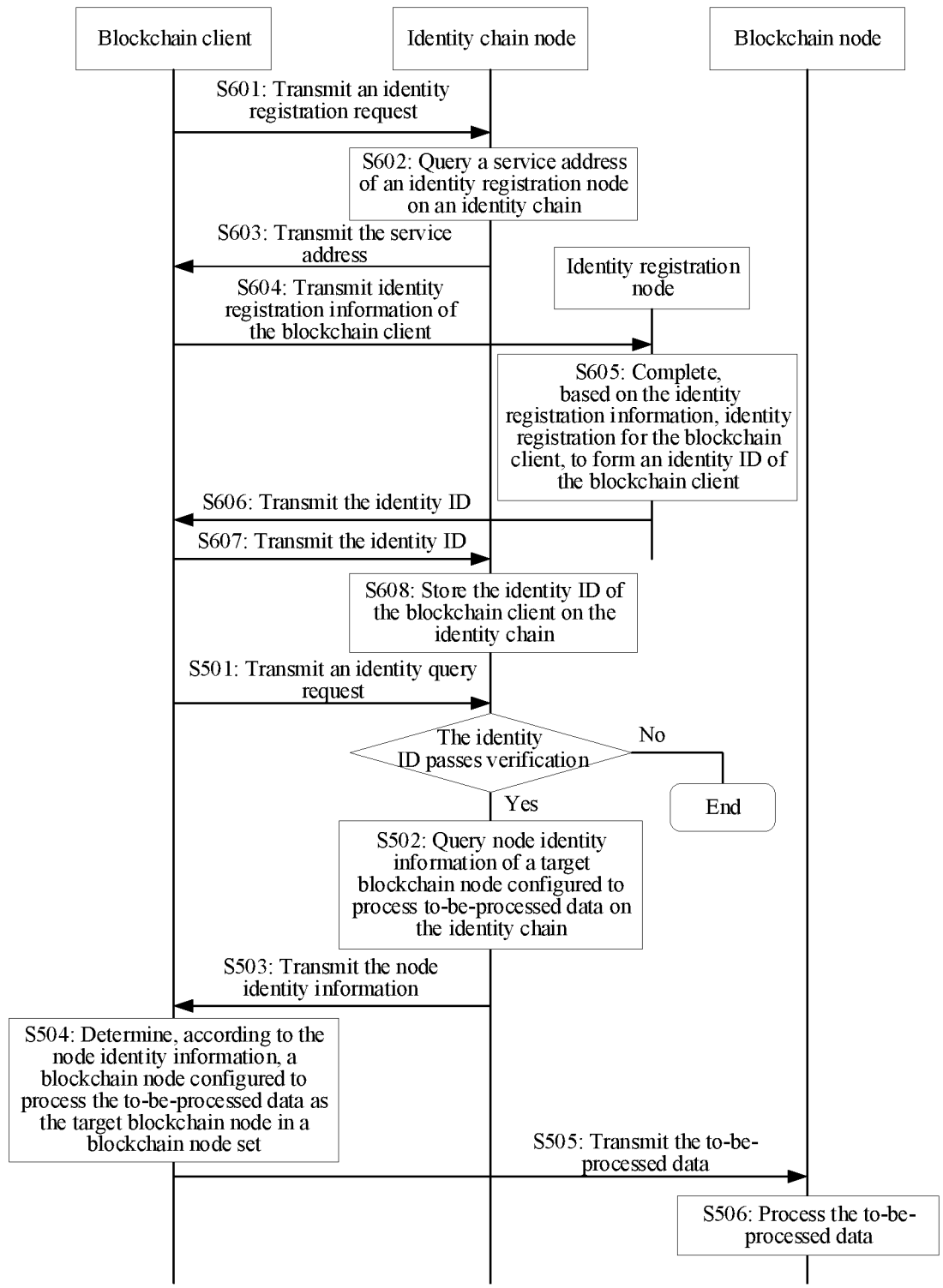
FIG. 6 is a schematic flowchart of a data processing method according to an embodiment of this application.

In some embodiments, the identity chain node may be further configured to implement identity registration for the blockchain client and each blockchain node on the application chain. Correspondingly, the blockchain system further includes an identity registration node. The identity registration node can provide an identity registration service, and the identity registration service may be deployed on any identity registration node corresponding to the identity chain. Based on FIG. 5, FIG. 6 is a schematic flowchart of a data processing method according to an embodiment of this application. As shown in FIG. 6, before step S501, the method further includes the following steps:

Step S601: A blockchain client transmits an identity registration request to an identity chain node.

The identity registration request is used for requesting identity registration on the identity chain. For each blockchain client, before the client function is implemented, it is necessary to register an identity on the identity chain. In this way, through the identity chain, a trusted identity service can be provided to all blockchain clients and all blockchain nodes in the blockchain system.

Step S602: The identity chain node queries, in response to the identity registration request, a service address of an identity registration node on an identity chain.

The identity registration node is a node configured to register the identity for the blockchain client. The identity registration node can provide the identity registration service. The identity registration node as an "identity issuer" can provide a "root identity" service on the identity chain.

Step S603: The identity chain node transmits the service address to the blockchain client.

Step S604: The blockchain client transmits identity registration information of the blockchain client to the identity registration node corresponding to the service address.

The identity registration information includes registration information such as an identity type, a public key, an identity attribute, and a service.

Step S605: The identity registration node completes, based on the identity registration information, identity registration for the blockchain client, to form an identity ID of the blockchain client.

As the "identity issuer", the identity registration node reviews the identity registration information submitted by the user, issues an identity, and generates the identity ID and an identity issuance signature.

Step S606: The identity registration node transmits the identity ID to the blockchain client.

After the identity registration for the blockchain client is completed through steps S601 to S606 above, the method further includes:

Step S607: The blockchain client transmits the identity ID to the identity chain node.

Step S608: The identity chain node stores the identity ID of the blockchain client on the identity chain.

The identity ID includes at least one of the following: a personal identity ID, an application ID, a device ID, and an institution ID.

In some embodiments, the identity registration may be further performed on the blockchain node, and steps of the registration are the same as those of the identity registration process for the blockchain client, including the following steps (not shown in FIG. 6):

Step S61: A blockchain node transmits an identity registration request to an identity chain node.

Step S62: The identity chain node queries, in response to the identity registration request, a service address of an identity registration node on an identity chain.

Step S63: The identity chain node transmits the service address to the blockchain node.

Step S64: The blockchain node transmits identity registration information of the blockchain node to the identity registration node corresponding to the service address.

Step S65: The identity registration node completes, based on the identity registration information, identity registration for the blockchain node, to form an identity ID of the blockchain node.

Step S66: The identity registration node transmits the identity ID to the blockchain node.

After the identity registration for the blockchain node is completed through steps S61 to S66 above, the method further includes:

Step S67: The blockchain node transmits the identity ID to the identity chain node.

Step S68: The identity chain node stores the identity ID of the blockchain node on the identity chain.

Further referring to FIG. 6, before step S502, the method further includes:

Step S609: The identity chain node verifies the identity ID through the identity chain, that is, verifies whether the identity ID is issued by an identity registration service.

If the verification is passed, step S502 is performed. If the validation fails, the process ends.

In the data processing method provided in this embodiment of this application, the identity registration for the blockchain client and the blockchain node is implemented through the identity chain node, and the identity ID obtained by the registration is stored on the identity chain. In this way, in the subsequent process of data processing, the identity verification for the data processing node can be directly requested through the identity chain, so that the trusted execution of the data processing can be ensured.

Figure 7:
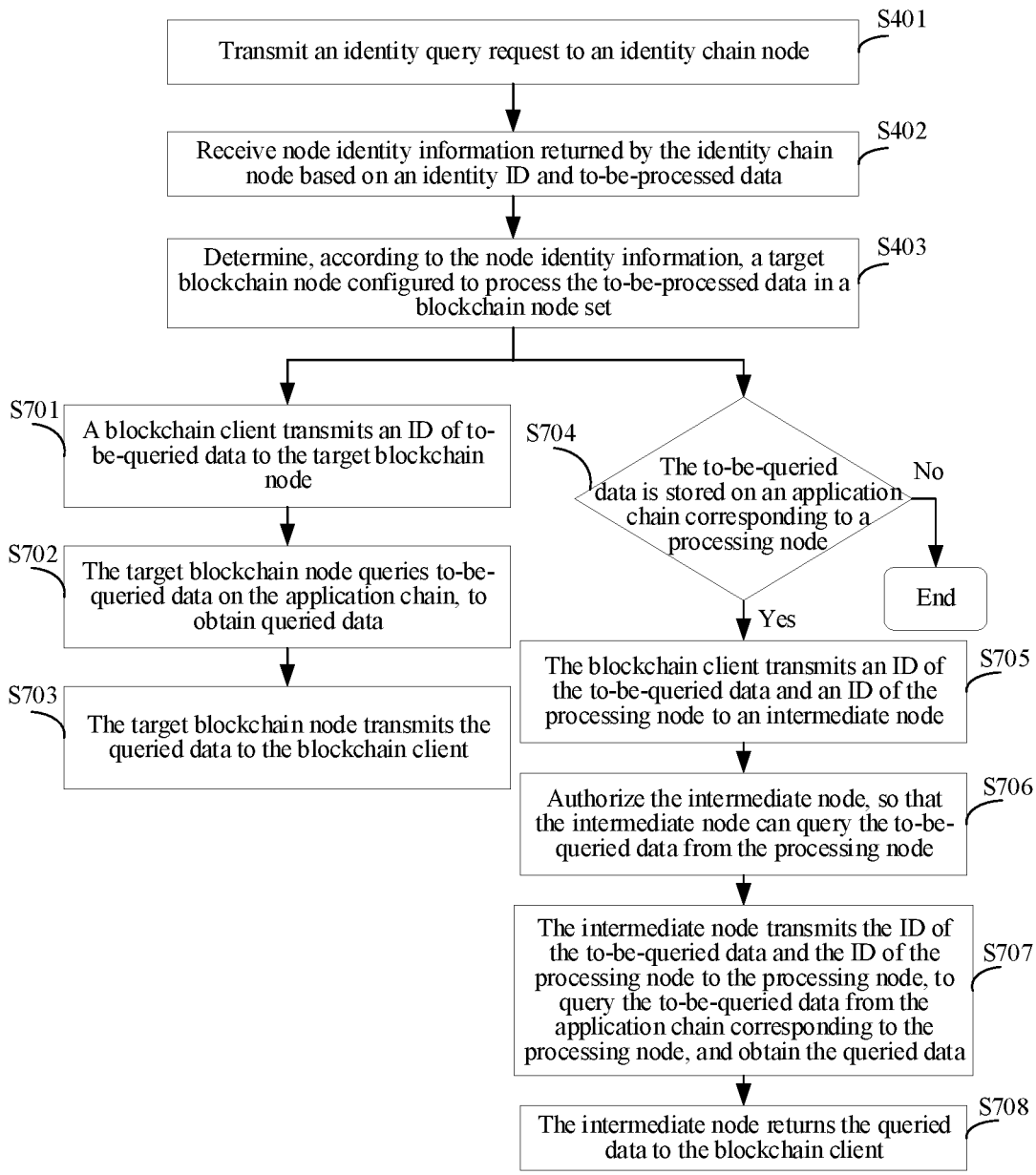
FIG. 7 is a schematic flowchart of a data processing method according to an embodiment of this application.

In some embodiments, the target blockchain node may process the data by querying to-be-queried data on the blockchain, and the data ID includes an ID of the to-be-queried data. Based on FIG. 4, FIG. 7 is a schematic flowchart of a data processing method according to an embodiment of this application. As shown in FIG. 7, step S404 may be implemented by the following steps:

Step S701: A blockchain client transmits an ID of to-be-queried data to the target blockchain node. Step S702: The target blockchain node queries the to-be-queried data on an application chain, to obtain queried data. Step S703: The target blockchain node transmits the queried data to the blockchain client.

In some other embodiments, the target blockchain node may alternatively process the data by authorizing a blockchain node to query the to-be-queried data on another blockchain node. Then, the data ID includes the ID of the to-be-queried data, and the target blockchain node includes at least an intermediate node and a processing node. The intermediate node is a node authorized by the blockchain client, and the intermediate node is configured to connect the blockchain client to the processing node, to obtain, from the processing node, the to-be-queried data that the blockchain client needs to query. The processing node is used as an execution node that actually performs the query. The processing node completes, in response to a query request of the blockchain client transmitted by the intermediate node, a query of the to-be-queried data, to obtain queried data, and returns the queried data to the blockchain client through the intermediate node. The processing node does not communicate directly with the blockchain client, but the processing node communicates with the blockchain client through the intermediate node.

Further referring to FIG. 7, step S404 may be implemented by the following steps:

Step S704: Determine whether the to-be-queried data is stored on an application chain corresponding to a processing node. If a determining result is yes, step S705 is performed. If a determining result is no, the process ends.

Step S705: The blockchain client transmits the ID of the to-be-queried data and an ID of the processing node to an intermediate node.

In some embodiments, after the transmitting the ID of the to-be-queried data and an ID of the processing node to an intermediate node, the following steps may be further included: Step S706: Authorize the intermediate node, so that the intermediate node can query the to-be-queried data from the processing node.

Step S707: The intermediate node transmits the ID of the to-be-queried data and the ID of the processing node to the processing node, to query the to-be-queried data from the application chain corresponding to the processing node, and obtain the queried data.

Step S708: The intermediate node returns the queried data to the blockchain client.

In some embodiments, the blockchain system may further include a notary node. That is, the target blockchain node includes a notary node and a data processing node. The notary node is selected in the blockchain system. There is at least one notary node. The identity information of the notary node also needs to be registered on the identity chain. A notary set formed by a plurality of notaries coordinates an interoperation between different application chains. The notary set reaches a consensus on whether an event occurs through preset conditions. For example, if M notaries out of N notaries reach a consensus, the event may be submitted to the blockchain node for execution.

Figure 8:
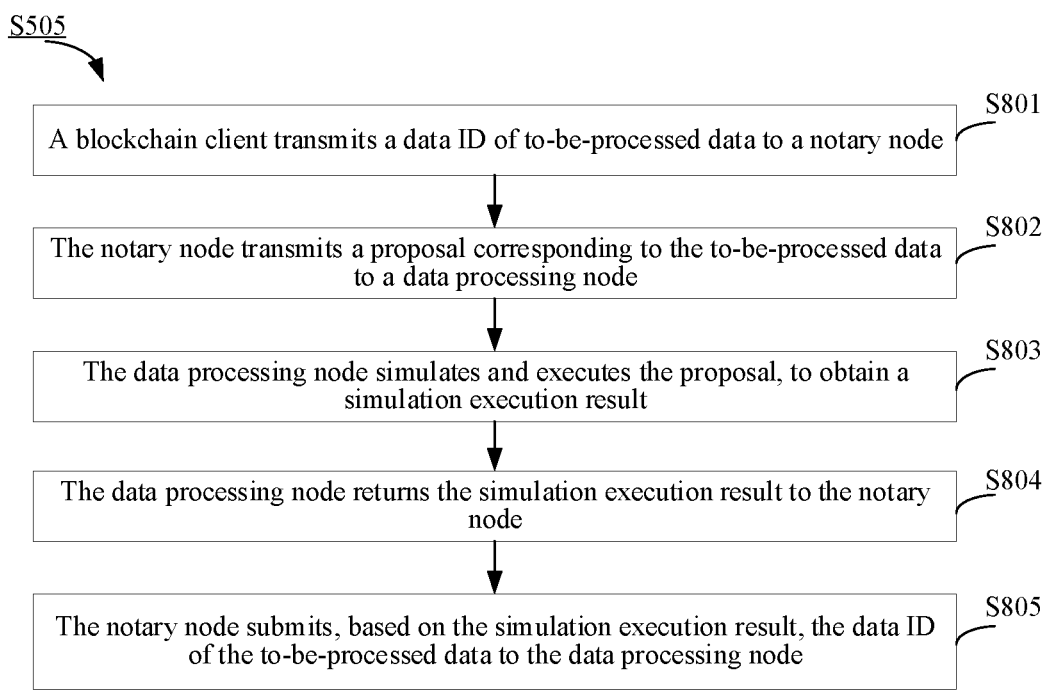
FIG. 8 is a schematic flowchart of a data processing method according to an embodiment of this application.

The data processing process implemented based on the notary node provided in this embodiment of this application is described herein by using any notary node as an example. Based on FIG. 5, FIG. 8 is a schematic flowchart of a data processing method according to an embodiment of this application. As shown in FIG. 8, step S505 may be implemented by the following steps:

Step S801: A blockchain client transmits a data ID of to-be-processed data to a notary node.

In this embodiment of this application, the data ID may be transmitted to all or some of the notary nodes in the notary set, and the notary nodes may reach a consensus on whether an event occurs.

Step S802: The notary node transmits a proposal corresponding to the data to a data processing node.

In some embodiments, the data ID may be a transaction ID corresponding to a request of a cross-chain transaction. After receiving the request of the cross-chain transaction, notaries initiate respective proposals to a data processing node on a relevant application chain.

The proposal is described below: the consensus algorithm solves the process of reaching a consensus on a proposal. The meaning of the proposal is very broad in the distributed system, such as the order in which a plurality of events occur, the value corresponding to a certain key, who is the leader, the transaction, . . . , or the like. It may be considered that any information that needs to be agreed upon is a proposal, which in the blockchain network means the transaction. For example, a user needs to conduct a transaction on the blockchain. The transaction content is: A transfers n assets to B. Then the transaction content is a proposal.

Step S803: The data processing node simulates and executes the proposal, to obtain a simulation execution result.

The simulation execution is described herein by further using the proposal of "A transfers n assets to B" as an example: The simulation execution means that the node on the blockchain (that is, the data processing node) tries to execute the transaction, reduces the assets of A by n, and increases the assets of B by n. The so-called simulation execution means that the asset changes of A and B do not take effect, but just whether the transaction can be executed is attempted. If the simulation execution succeeds, the asset changes do not take effect until a subsequent submission stage. If A does not have n assets at all, the simulation execution fails.

Step S804: The data processing node returns the simulation execution result to the notary node.

Step S805: The notary node submits the data ID of the data to the data processing node based on the simulation execution result.

The simulation execution result may be that the simulation execution succeeds or the simulation execution fails. If the simulation execution succeeds, the formal submission of the proposal can be carried out in the subsequent submission stage.

In the data processing method provided in this embodiment of this application, the data processing process is monitored through the notary, which can ensure that the data processing process is performed fairly in order, and the data processing process is monitored through a plurality of notaries. In this way, it is possible to avoid a case that a single notary cheats and initiates a wrong proposal and consequently the notary acting as an intermediary carries out unexpected coordination among a plurality of application chains.

The data processing process implemented based on the notary node provided in this embodiment of this application is described below by further using any notary node as an example. This embodiment of this application provides a data processing method, applicable to a target blockchain node on an application chain. The target blockchain node includes at least a notary node and a data processing node. The notary node is a node pre-registering an identity on an identity chain node. The method includes:

Step S11: A notary node in a target blockchain node receives a data ID of to-be-processed data transmitted by a blockchain client. Step S12: The notary node transmits a proposal corresponding to the data to a data processing node. Step S13: The notary node obtains a simulation execution result returned by the data processing node after simulating and executing the proposal. Step S14: The notary node submits the data ID of the data to the data processing node based on the simulation execution result, to implement a cross-chain interoperation between different application chains.

In some embodiments, the method may further include the following steps:

Step S15: The notary node transmits an identity registration request to an identity chain node. Step S16: The notary node receives notary identity information returned by the identity chain node in response to the identity registration request. Step S17: The notary node receives, when the notary node includes the notary identity information, the data ID of the data transmitted by the blockchain client.

In some embodiments, the method may further include the following steps: transmitting the notary identity information to the identity chain node, so that the identity chain node stores the notary identity information of the notary node on an identity chain.

In some embodiments, the data processing node corresponds to a first target application chain, and the simulation execution result includes a signature of the first target application chain.

In some embodiments, there are a plurality of proposals, and each proposal corresponds to a simulation execution result. The submitting the data ID of the data to the data processing node based on the simulation execution result may be implemented by the following steps: combining a plurality of simulation execution results into a submission request and transmitting the submission request to a second target application chain; and when the second target application chain verifies that the submission request meets preset submission conditions, submitting the data ID of the data to the data processing node in the second target application chain.

Figure 9:
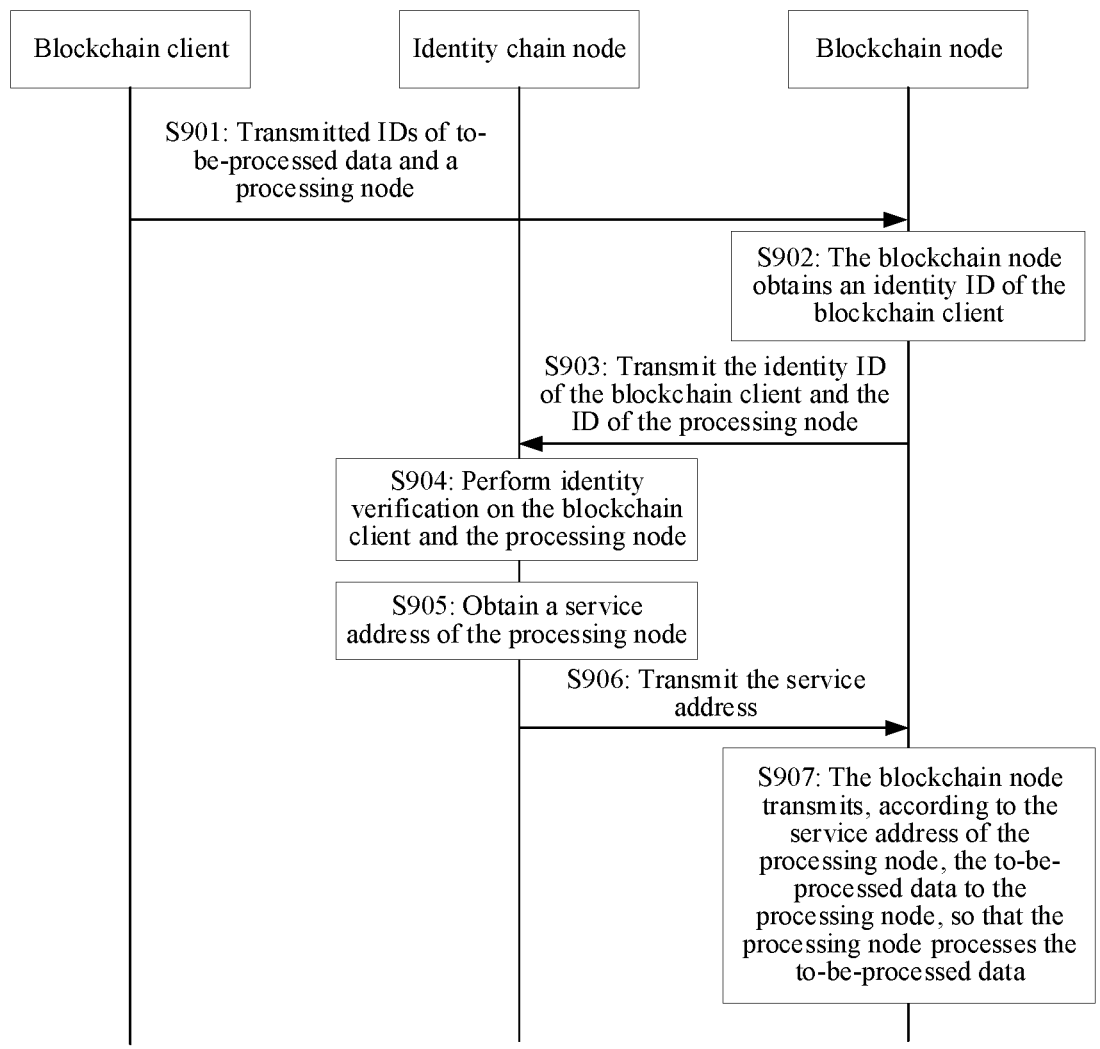
FIG. 9 is a schematic flowchart of a data processing method according to an embodiment of this application.

In some embodiments, the blockchain system includes a blockchain client, an identity chain node, and a blockchain node as an intermediate node. FIG. 9 is a schematic flowchart of a data processing method according to an embodiment of this application. As shown in FIG. 9, the method includes the following steps:

Step S901: A blockchain node receives IDs of to-be-processed data and a processing node transmitted by a blockchain client, where the processing node is a node corresponding to an application chain storing the data.

Step S902: The blockchain node obtains an identity ID of the blockchain client.

Step S903: The blockchain node transmits the identity ID of the blockchain client and the ID of the processing node to an identity chain node.

Step S904: The identity chain node performs identity verification on the blockchain client and the processing node.

Step S905: The identity chain node obtains, when the blockchain client and the processing node pass the identity verification, a service address of the processing node.

Step S906: The identity chain node transmits the service address of the processing node to the blockchain node.

Step S907: The blockchain node transmits, according to the service address of the processing node, the data to the processing node, so that the processing node processes the data.

The following describes an exemplary application of this embodiment of this application in an actual application scenario.

This embodiment of this application provides a data processing method, applicable to a blockchain system. The blockchain system is a hierarchically interconnected blockchain system. The entire system can be divided into two layers. An underlying layer is an identity main chain (that is, an identity chain), and an upper layer is a plurality of parallel application sub-chains (that is, application chains). The data processing method of this embodiment of this application is implemented through different nodes in the blockchain system.

In this embodiment of this application, an identity main chain manages identity data of individuals, devices, institutions, and upper-layer application sub-chains. An identity is issued by a trusted identity issuer. As a regulatory role in the entire system, the identity issuer may be a single trusted institution or a consortium of a plurality of institutions. If the identity issuer is a consortium, the consortium may also form a blockchain system for consortium governance. As an identity entity, the identity issuer is the first trusted identity on the identity main chain, and is also referred to as a "root identity". The identity is recorded in a "genesis block" of the identity main chain and is the root of trust for all identities. In addition to the "root identity", all identities issued by the "root identity" are recorded on the identity main chain, and the identity includes the following parts:

Identity identifier (identity ID): which serves as a unique identification code of an identity. For example, for a user, an identity ID may be a personal identity ID such as a personal account number, or a name. For a device, an identity ID may be a device ID such as a device number, a device name, or a device parameter. For an organization or institution, an identity ID may be an organization or institution ID such as a name of the organization or institution, or an account number of the organization or institution. For an application, an identity ID may be an application ID such as a name of the application.

Identity type: which refers to types of objects with identity information on the identity chain, where the objects with identity information on the identity chain include but are not limited to: individuals, devices, institutions, application sub-chains, and other types. Identity public key (PubKey): which corresponds to each object with identity information under each identity type, that is, each object includes an identity public key, where the identity public key is an asymmetric encryption public key corresponding to the identity information of each object, and is used for performing signature verification on the identity information of the object, and a private key is held by the owner of the identity information. Identity issuance signature (Sign): which refers to the process of issuing a signature to the owner of the identity information by the identity issuer. Identity attribute: which is an identity attribute customized by a service, and is used by the identity issuer for authenticating and authorizing the identity information. Identity service: which is used for recording a service address of the identity information, an API, and other information, and according to identity types, is divided into: a personal identity service, used for recording an identity ID of an institution or application sub-chain hosting personal data; and an identity service of the institution or application sub-chain, used for recording a network service address provided to the outside by the institution or application sub-chain, such as a query API, an update API, or the like.

Figure 10:
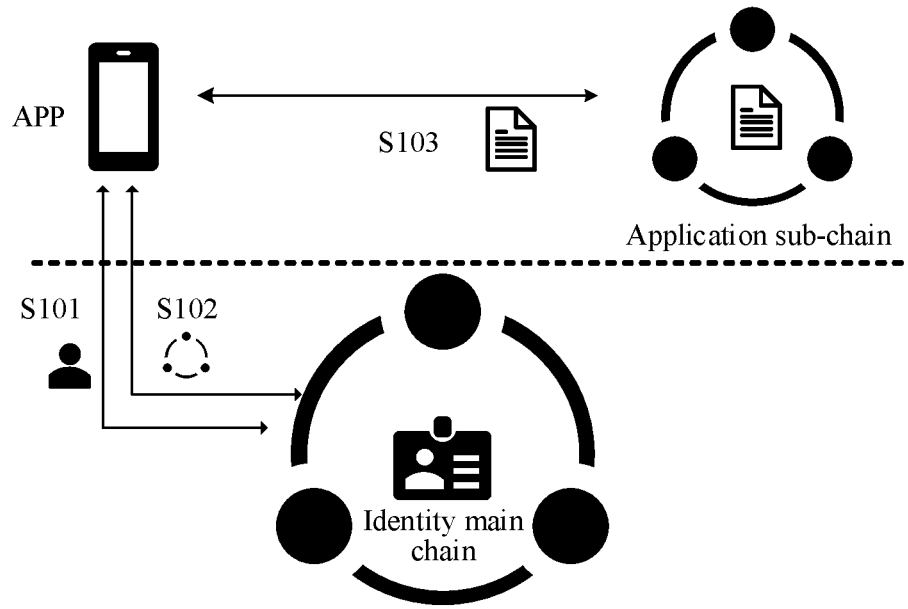
FIG. 10 is a schematic diagram of a use process of an identity service according to an embodiment of this application.

The identity service is an important link of the entire blockchain system to solve trusted data access. A use process of the identity service is described herein by using an example of querying or updating a piece of personal data. FIG. 10 is a schematic diagram of a use process of an identity service according to an embodiment of this application. As shown in FIG. 10, the process includes the following steps:

Step S101: A blockchain client uses an identity ID of an individual to query an identity service of the identity ID on an identity main chain, where the identity service of the individual returned by the identity main chain is an identity ID of an application sub-chain that the individual hosts.

The blockchain client may be a client corresponding to any app on a terminal.

Step S102: The blockchain client uses the identity ID of the application sub-chain to query an identity service of the ID on the identity main chain, where a network service address provided to the outside by the sub-chain and returned by the identity main chain is an API used for querying and updating.

Step S103: The blockchain client initiates a query or update operation for personal data through a service address of the application sub-chain, and the application sub-chain reviews and executes the operation.

Figure 11:
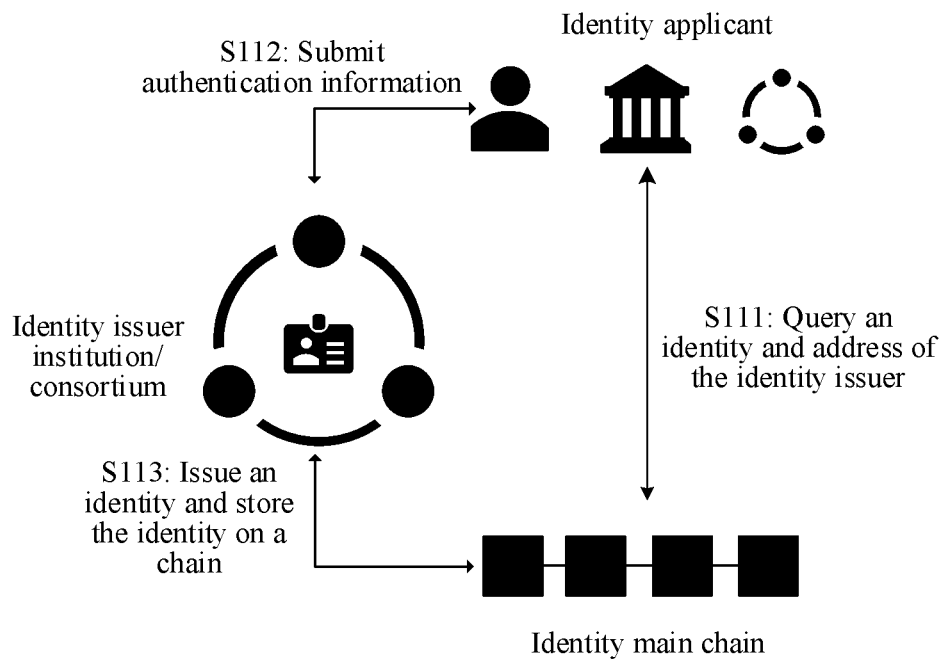
FIG. 11 is a schematic diagram of an identity issuance process according to an embodiment of this application.

In some embodiments, the blockchain system may further implement the identity issuance of individuals, institutions, institution consortiums, or the like. FIG. 11 is a schematic diagram of an identity issuance process according to an embodiment of this application. As shown in FIG. 11, the process includes the following steps:

Step S111: As an identity applicant, an individual, institution, or institution consortium queries an identity chain through an app for a service address of an "identity issuer", that is, a "root identity" service on the identity chain.

Step S112: After obtaining a blockchain service address of the "identity issuer", the identity applicant submits identity authentication information, including an identity type, a public key, an attribute, and a service, to the service address, and the "identity issuer" reviews the identity authentication information submitted by the applicant, issues an identity, and generates an identity identifier (that is, an identity ID) and an identity issuance signature.

Step S113: After the identity applicant obtains the identity issued by the "identity issuer", the identity applicant submits, or the identity applicant submits through the "identity issuer", the issued identity to the identity chain for identity registration, and an identity chain node first verifies whether the identity on the identity chain is legitimate, that is, whether the identity on the identity chain is issued by a "root identity", and then saves the identity information on the identity chain for subsequent query and verification.

An update and recall process of the identity is similar to the issuance process.

In some embodiments, upper-layer applications may build a plurality of application sub-chains of different services. How to achieve trusted data interworking between different application sub-chains is an important problem facing the current blockchain. The hierarchically interconnected blockchain system in this embodiment of this application, based on an underlying identity main chain, may effectively solve a problem of identity mutual trust and data authorization access between different application sub-chains. The data interworking between application sub-chains includes cross-chain query and update.

Figure 12:
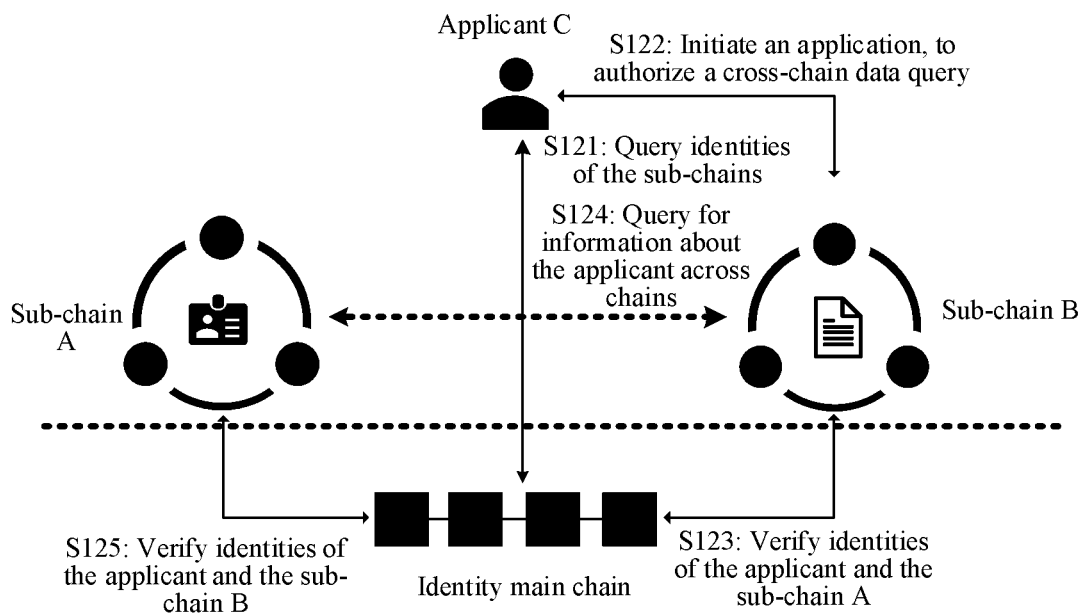
FIG. 12 is a flowchart of a cross-chain interoperation according to an embodiment of this application.

For the cross-chain query between application sub-chains, it is necessary to solve the problem of identity mutual trust and data authorization between different application sub-chains. An applicant C authorizing a sub-chain B to query data of the applicant on a sub-chain A is taken as an example, and identity information of each of the applicant C, the sub-chain A, and the sub-chain B has been registered on the identity chain. A cross-chain interoperation process as shown in FIG. 12 includes the following steps:

Step S121: An applicant C queries an identity main chain through an app, and obtains identity information and service addresses of sub-chains A and B, to query identities of the sub-chains.

Step S122: The applicant C initiates an application to the sub-chain B, authorizes the sub-chain B to query the sub-chain A for certain data (that is, to-be-queried data) of C hosted on the sub-chain A, and uses an identity private key of C for signing.

Step S123: The sub-chain B queries the identity main chain, verifies the identity information of the applicant C and the sub-chain A, and obtains the service address of the sub-chain A.

Step S124: The sub-chain B initiates a cross-chain query request for the sub-chain A, where the request is accompanied by an application of C and an authorization signature of C.

Step S125: After receiving the cross-chain query request, the sub-chain A verifies the identities and signatures of C and B, and returns the hosted data of C.

Through the above process, based on the identity main chain, a trusted cross-chain query can be conducted between different sub-chains, without the need to pre-establish a cross-chain channel, which has high flexibility and scalability. The credibility of an identity is guaranteed by an underlying identity main chain, so that hierarchical governance of underlying and application-layer blockchains is implemented. To ensure secure transmission of data, message transmission between any two identity entities can be signed by using an identity private key of a message transmitting party, and encrypted by using a public key of a message receiving party.

For a cross-chain interoperation between application sub-chains, the cross-chain interoperation means that for a transaction, data on a plurality of blockchains needs to be modified simultaneously, and is more complex than the cross-chain query, which is mainly embodied in how to ensure the consistency of operations between a plurality of different application sub-chains, and the further need of avoiding centralized links.

This embodiment of this application provides a decentralized cross-chain interoperation method. A plurality of organizations or institutions are selected as a notary set. An identity of a notary also needs to be registered on an identity main chain. The notary set coordinates an interoperation between different sub-chains, monitors events of a chain A automatically or on demand, and after a specified event occurs, performs a corresponding action on a chain B, to respond to the event. The notary set reaches a consensus on whether the event occurs by presetting specific conditions. For example, M out of N notaries have reached a consensus.

Figure 13:
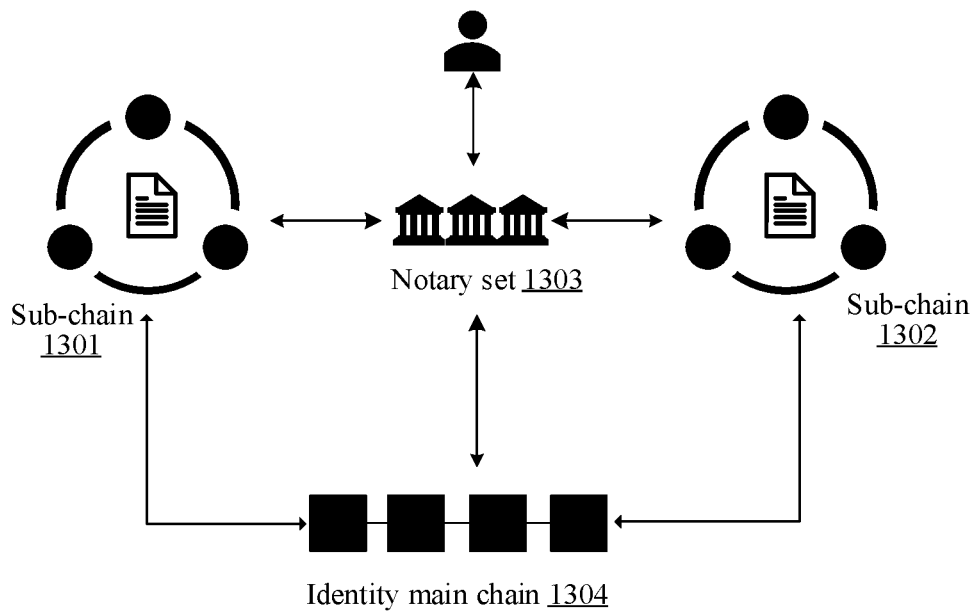
FIG. 13 is an architectural diagram of a cross-chain interoperation according to an embodiment of this application.

FIG. 13 is an architectural diagram of a cross-chain interoperation according to an embodiment of this application. As shown in FIG. 13, in the entire architecture of a cross-chain interoperation, two sub-chains 1301 and 1302 requiring the cross-chain interoperation, a notary set 1303, and an identity main chain 1304 are included. A plurality of notaries are included in the notary set 1303, and identities of the notaries are also registered on the identity main chain 1304.

Figure 14:
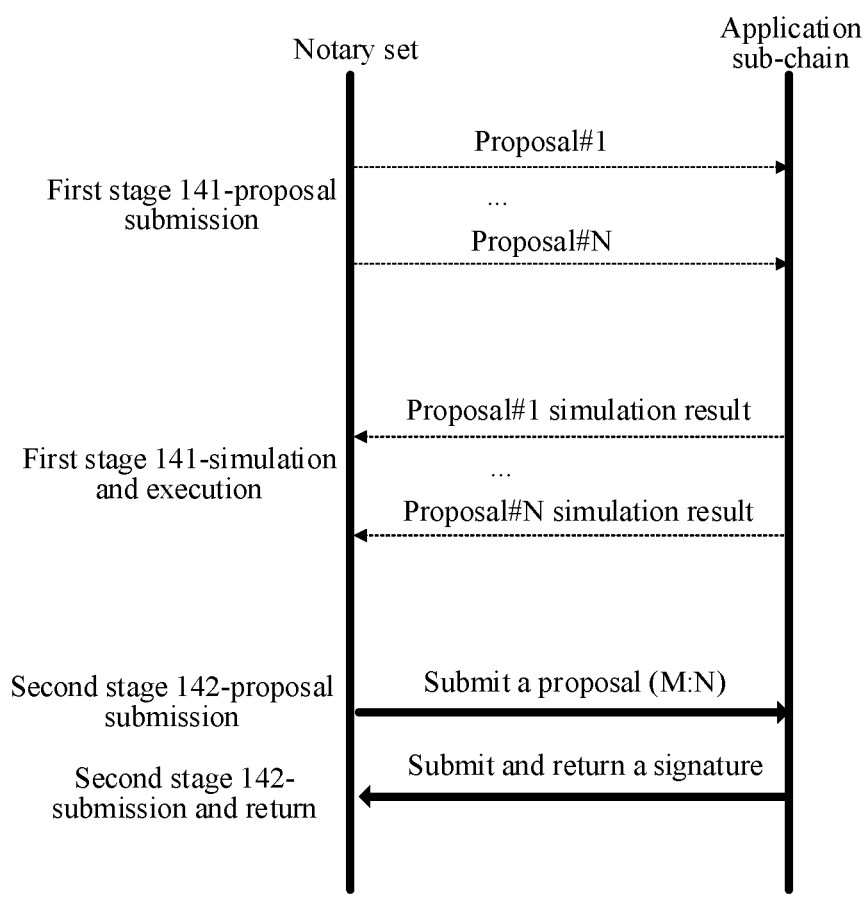
FIG. 14 is a schematic diagram of a decentralized two-stage cross-chain interoperation according to an embodiment of this application.

The notary set initiates a transaction on an application sub-chain in a two-stage manner. FIG. 14 is a schematic diagram of a decentralized two-stage cross-chain interoperation according to an embodiment of this application. As shown in FIG. 14, in the first stage 141, two processes of proposal submission and simulation execution are included. In the proposal submission process in the first stage 141, after receiving a request for a cross-chain transaction, N notaries initiate respective proposals to relevant application sub-chains. The proposals include signatures of the notaries. In the simulation execution process in the first stage 141, after receiving N proposals, the application sub-chains perform simulation and execution, and return a simulation execution result to the notaries. The simulation execution result is accompanied by signatures of the application sub-chains.

In the second stage 142, two processes of proposal submission and submission and return are included. In the proposal submission process in the second stage 142, the notary set collects a plurality of proposals and simulation results corresponding to the proposals, combines the proposals and simulation results into a submission request, and transmits the submission request to the application sub-chains. The application sub-chains verify whether the request meets preset submission conditions (for example, there are M proposals of N notaries whose simulation results are consistent), and if the conditions are met, submit the request. In the submission and return process in the second stage 142, after completing request submission, the application sub-chains submit a request execution result to the notary set, and return the signatures.

Through a plurality of notaries in the two-stage manner, it is possible to avoid a case that a single notary cheats and initiates a wrong proposal and consequently the notary acting as an intermediary carries out unexpected coordination among a plurality of application sub-chains.

In this embodiment of this application, a verification process among different roles such as the owners, administrators, and visitors of the data is unblocked based on the identity main chain, and a two-stage decentralized cross-chain interoperation scheme is provided, to achieve a flexible blockchain system capable of large-scale cross-chain interconnection, to ensure secure cross-chain circulation of sensitive data, and support a hierarchical blockchain governance mode.

The following further illustrates an exemplary structure when a data processing apparatus 354 provided by this embodiment of this application is implemented as a software module. In some embodiments, as shown in FIG. 3, the software module in the data processing apparatus 354 stored in the memory 350 may be a data processing apparatus in a node 202. Alternatively, the data processing apparatus may be deployed in a blockchain system. The blockchain system includes an identity chain and a plurality of application chains. The identity chain is configured to provide an identity service for blockchain applications deployed on the application chains. The data processing apparatus includes: a first transmission module 3541, configured to transmit an identity query request used for querying node identity information to an identity chain node, the identity query request including an identity ID of a blockchain client and a data ID of to-be-processed data; a first receiving module 3542, configured to receive the node identity information corresponding to the identity ID and the data ID returned by the identity chain node; a determining module 3543, configured to determine, in a blockchain node set, a target blockchain node corresponding to the node identity information; and a second transmission module 3544, configured to transmit the data ID to the target blockchain node, to process the data through the target blockchain node.

In some embodiments, the identity chain node corresponds to an identity chain; the identity chain stores identity information of the blockchain client and node identity information of each blockchain node; the identity information of the blockchain client includes at least the identity ID; and a blockchain node in the blockchain node set corresponds to at least one application chain, and the application chain stores blockchain data; and the identity chain is configured to provide an identity service for a blockchain application deployed on the application chain.

In some embodiments, the apparatus further includes: an identity registration request transmission module, configured to transmit an identity registration request to the identity chain node; a service address receiving module, configured to receive a service address returned by the identity chain node in response to the identity registration request; an identity registration information transmission module, configured to transmit identity registration information of the blockchain client to an identity registration node corresponding to the service address; and an identity ID receiving module, configured to receive, after the identity registration node completes identity registration for the blockchain client based on the identity registration information, the identity ID returned by an identity registration service.

In some embodiments, the apparatus further includes: a processing module, configured to transmit the identity ID to the identity chain node, so that the identity chain node stores the identity ID of the blockchain client on the identity chain, where the identity ID includes at least one of the following: a personal identity ID, an application ID, a device ID, and an institution ID, and the first receiving module is configured to receive, when the identity ID passes verification of the identity chain node through the identity chain, the node identity information corresponding to the data returned by the identity chain node.

In some embodiments, the data ID includes to-be-queried data; the second transmission module is configured to: transmit an ID of the to-be-queried data to the target blockchain node, to query the to-be-queried data on an application chain through the target blockchain node, and obtain queried data; and correspondingly, receive the queried data returned by the target blockchain node.

In some embodiments, the data includes to-be-queried data; the target blockchain node includes at least an intermediate node and a processing node; the second transmission module is configured to: transmit, when it is determined that the to-be-queried data is stored on an application chain corresponding to the processing node, an ID of the to-be-queried data and an ID of the processing node to the intermediate node, to query the to-be-queried data from the application chain corresponding to the processing node through the intermediate node, and obtain queried data; and correspondingly, receive the queried data returned by the intermediate node.

In some embodiments, the apparatus further includes: an authorization module, configured to authorize, after transmitting the ID of the to-be-queried data and the ID of the processing node to the intermediate node, the intermediate node, so that the intermediate node can query the to-be-queried data from the processing node.

In some embodiments, the target blockchain node includes a notary node and a data processing node; and the second transmission module is configured to: transmit the data ID to the notary node, so that the notary node transmits a proposal corresponding to the data to the data processing node, obtains a simulation execution result returned by the data processing node after simulating and executing the proposal, and submits, based on the simulation execution result, the data ID of the data to the data processing node.

In some embodiments, the software module in the data processing apparatus 354 stored in the memory 350 may be a data processing apparatus in the node 202. Alternatively, the data processing apparatus may be deployed in a blockchain system. The blockchain system includes an identity chain and a plurality of application chains. The identity chain is configured to provide an identity service for blockchain applications deployed on the application chains. The data processing apparatus includes: a second receiving module, configured to receive an identity query request transmitted by a blockchain client, the identity query request including an identity ID of the blockchain client and a data ID of to-be-processed data; a query module, configured to query, on the identity chain according to the identity ID, node identity information of a target blockchain node configured to process the data; and a third transmission module, configured to transmit the node identity information to the blockchain client, so that the blockchain client transmits, according to the node identity information, the data ID to the target blockchain node, and processes the data through the target blockchain node.

In some embodiments, the apparatus further includes: an identity registration request receiving module, configured to receive an identity registration request transmitted by the blockchain client; a query module, configured to query, in response to the identity registration request, a service address of an identity registration service on the identity chain; a service address transmission module, configured to transmit the service address to the blockchain client, so that the blockchain client transmits identity registration information to the identity registration service, to complete identity registration for the blockchain client, and obtain an identity ID of the blockchain client.

In some embodiments, the apparatus further includes: an identity ID receiving module, configured to receive an identity ID transmitted by the blockchain client; a verification module, configured to verify whether the identity ID is issued by the identity registration service; and a storage module, configured to store, when the verification is passed, the identity ID on the identity chain, the identity ID including at least one of the following: a personal identity ID, an application ID, a device ID, and an institution ID.

In some embodiments, the software module in the data processing apparatus 354 stored in the memory 350 may be a data processing apparatus in the node 202. Alternatively, the data processing apparatus may be deployed in a blockchain system. The blockchain system includes an identity chain and a plurality of application chains. The identity chain is configured to provide an identity service for blockchain applications deployed on the application chains. The data processing apparatus includes: a third receiving module, configured to receive a data ID of to-be-processed data and an ID of a processing node transmitted by a blockchain client, where the processing node is a node corresponding to an application chain storing the data; an obtaining module, configured to obtain an identity ID of the blockchain client; a fourth transmission module, configured to transmit the identity ID of the blockchain client and the ID of the processing node to the identity chain node, so that the identity chain node performs identity verification on the blockchain client and the processing node; a fourth receiving module, configured to receive, when the blockchain client and the processing node pass the identity verification, a service address of the processing node transmitted by the identity chain node; and a fifth transmission module, configured to transmit, according to the service address, the data ID to the processing node, so that the processing node processes the data.

Descriptions of the apparatus embodiments of this application are similar to the descriptions of the method embodiments. The apparatus embodiments have beneficial effects similar to those of the method embodiments and therefore are not described in detail. For technical details that are not disclosed in the apparatus embodiments, refer to the descriptions of the method embodiments of this application for understanding.

An embodiment of this application provides a computer program product or a computer program. The computer program product or the computer program includes computer instructions. The computer instructions are stored in a computer-readable storage medium. A processor of a computer device reads the computer instructions from the computer-readable storage medium. The processor executes the computer instructions, to cause the computer device to perform the above method of the embodiments of this application.

An embodiment of this application provides a storage medium storing executable instructions, the executable instructions, when executed by a processor, causing the processor to perform the method, for example, the method as shown in FIG. 4 provided in the embodiments of this application.

In some embodiments, the storage medium may be a computer-readable storage medium, such as a ferromagnetic random access memory (FRAM), a ROM, a programmable read-only memory (PROM), an erasable programmable read-only memory (EPROM), an electrically erasable programmable read-only memory (EEPROM), a flash memory, a magnetic surface memory, an optical disc, or a compact disc read-only memory (CD-ROM); or may be any device including one of or any combination of the foregoing memories.

In some embodiments, the executable instructions may be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment. In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in a plurality of collaborative files (for example, be stored in files of one or more modules, subprograms, or code parts). In an example, the executable instructions may be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

INDUSTRIAL PRACTICALITY

In the embodiments of this application, an identity query request is transmitted to an identity chain node, the identity query request including an identity ID of a blockchain client and to-be-processed data. Then, node identity information returned by the identity chain node based on the identity ID and the data is received. According to the node identity information, a target blockchain node configured to process the data is determined in a blockchain node set. The to-be-processed data is transmitted to the target blockchain node, to process the data through the target blockchain node. In this way, through the identity chain node, a data processing process between different roles such as the owners, administrators and visitors of the data is unblocked, and trusted data transmission between different blockchains is guaranteed, which has great industrial practicality.

What is claimed is:

1. A data processing method, performed by a computer device acting as a blockchain client in a blockchain system, the blockchain system comprising an identity chain and a plurality of application chains, the identity chain being configured to provide an identity service for blockchain applications deployed on the application chains, and the method comprising:
   transmitting an identity query request used for querying node identity information to an identity chain node associated with the identity chain, the identity query request comprising an identity identifier (ID) of the blockchain client and a data ID of to-be-processed data;
   receiving the node identity information corresponding to the identity ID and the data ID returned by the identity chain node;
   determining, within a blockchain node set, a target blockchain node corresponding to the node identity information;
   transmitting the data ID to the target blockchain node, to query data on at least one of the plurality of application chains based on the data ID through the target blockchain node; and
   receiving the queried data returned by the target blockchain node.

2. The method according to claim 1, wherein
   there is a mapping relationship between the identity chain node and an identity chain, the identity chain stores identity information of the blockchain client and node identity information of each blockchain node, and the identity information of the blockchain client comprises at least the identity ID; and
   there is a mapping relationship between a blockchain node in the blockchain node set and at least one application chain, the application chain stores blockchain data, and the identity chain is configured to provide an identity service for a blockchain application deployed on the application chain.

3. The method according to claim 1, further comprising:
   transmitting an identity registration request to the identity chain node;
   receiving a service address returned by the identity chain node in response to the identity registration request;
   transmitting identity registration information of the blockchain client to an identity registration node corresponding to the service address; and
   receiving, after the identity registration node completes identity registration for the blockchain client based on the identity registration information, the identity ID returned by an identity registration service.

4. The method according to claim 3, further comprising:
   transmitting the identity ID to the identity chain node, so that the identity chain node stores the identity ID of the blockchain client on the identity chain, wherein the identity ID comprises at least one of the following: a personal identity ID, an application ID, a device ID, and an institution ID, and
   the receiving the node identity information corresponding to the identity ID and the data ID returned by the identity chain node comprises:
   receiving, when the identity ID passes verification of the identity chain node through the identity chain, the node identity information corresponding to the data returned by the identity chain node.

5. The method according to claim 1, wherein the data ID comprises to-be-queried data; the target blockchain node comprises at least an intermediate node and a processing node;
   the transmitting the data ID to the target blockchain node, to process the data through the target blockchain node comprises:
   transmitting, when it is determined that the to-be-queried data is stored on an application chain corresponding to the processing node, an ID of the to-be-queried data and an ID of the processing node to the intermediate node, to query the to-be-queried data from the application chain corresponding to the processing node through the intermediate node, and obtain queried data; and
   the method further comprises: receiving the queried data returned by the intermediate node.

6. The method according to claim 1, wherein the target blockchain node comprises at least an intermediate node and a processing node; the method further comprises:
   transmitting the data ID of the data and an ID of the processing node to the intermediate node, the processing node being a node corresponding to an application chain storing the data;
   transmitting the identity ID of the blockchain client and the ID of the processing node to the identity chain node through the intermediate node;
   performing identity verification on the blockchain client and the processing node through the identity chain node;
   receiving, when the blockchain client and the processing node pass the identity verification, a service address of the processing node transmitted by the identity chain node; and
   transmitting, according to the service address, the data ID to the processing node, to process the data through the processing node.

7. The method according to claim 1, wherein the target blockchain node comprises a notary node and a data processing node; and the transmitting the data ID to the target blockchain node, to process the data through the target blockchain node comprises:
   transmitting the data ID to the notary node, and transmitting, by the notary node, a proposal corresponding to the data to the data processing node and obtaining a simulation execution result returned by the data processing node after simulating and executing the proposal, so that the notary node submits the data ID of the data to the data processing node based on the simulation execution result.

8. A computer device acting as a blockchain client in a blockchain system, the blockchain system comprising an identity chain and a plurality of application chains, the identity chain being configured to provide an identity service for blockchain applications deployed on the application chains, the computer device comprising:
   a memory, configured to store executable instructions; and a processor, configured to execute the executable instructions stored in the memory and cause the computer device to perform a data processing method including:
   transmitting an identity query request used for querying node identity information to an identity chain node associated with the identity chain, the identity query request comprising an identity identifier (ID) of the blockchain client and a data ID of to-be-processed data;

receiving the node identity information corresponding to the identity ID and the data ID returned by the identity chain node;

determining, within a blockchain node set, a target blockchain node corresponding to the node identity information;

transmitting the data ID to the target blockchain node, to query data on at least one of the plurality of application chains based on the data ID through the target blockchain node; and receiving the queried data returned by the target blockchain node.

9. The computer device according to claim 8, wherein there is a mapping relationship between the identity chain node and an identity chain, the identity chain stores identity information of the blockchain client and node identity information of each blockchain node, and the identity information of the blockchain client comprises at least the identity ID; and there is a mapping relationship between a blockchain node in the blockchain node set and at least one application chain, the application chain stores blockchain data, and the identity chain is configured to provide an identity service for a blockchain application deployed on the application chain.

10. The computer device according to claim 8, wherein the method further comprises:

transmitting an identity registration request to the identity chain node;

receiving a service address returned by the identity chain node in response to the identity registration request;

transmitting identity registration information of the blockchain client to an identity registration node corresponding to the service address; and receiving, after the identity registration node completes identity registration for the blockchain client based on the identity registration information, the identity ID returned by an identity registration service.

11. The computer device according to claim 10, wherein the method further comprises:

transmitting the identity ID to the identity chain node, so that the identity chain node stores the identity ID of the blockchain client on the identity chain, wherein the identity ID comprises at least one of the following: a personal identity ID, an application ID, a device ID, and an institution ID, and the receiving the node identity information corresponding to the identity ID and the data ID returned by the identity chain node comprises:

receiving, when the identity ID passes verification of the identity chain node through the identity chain, the node identity information corresponding to the data returned by the identity chain node.

12. The computer device according to claim 8, wherein the data ID comprises to-be-queried data; the target blockchain node comprises at least an intermediate node and a processing node;

the transmitting the data ID to the target blockchain node, to process the data through the target blockchain node comprises:

transmitting, when it is determined that the to-be-queried data is stored on an application chain corresponding to the processing node, an ID of the to-be-queried data and an ID of the processing node to the intermediate node, to query the to-be-queried data from the application chain corresponding to the processing node through the intermediate node, and obtain queried data; and the method further comprises: receiving the queried data returned by the intermediate node.

13. The computer device according to claim 8, wherein the target blockchain node comprises at least an intermediate node and a processing node; the method further comprises:

transmitting the data ID of the data and an ID of the processing node to the intermediate node, the processing node being a node corresponding to an application chain storing the data;

transmitting the identity ID of the blockchain client and the ID of the processing node to the identity chain node through the intermediate node;

performing identity verification on the blockchain client and the processing node through the identity chain node;

receiving, when the blockchain client and the processing node pass the identity verification, a service address of the processing node transmitted by the identity chain node; and transmitting, according to the service address, the data ID to the processing node, to process the data through the processing node.

14. The computer device according to claim 8, wherein the target blockchain node comprises a notary node and a data processing node; and the transmitting the data ID to the target blockchain node, to process the data through the target blockchain node comprises:

transmitting the data ID to the notary node, and transmitting, by the notary node, a proposal corresponding to the data to the data processing node and obtaining a simulation execution result returned by the data processing node after simulating and executing the proposal, so that the notary node submits the data ID of the data to the data processing node based on the simulation execution result.

15. A non-transitory computer-readable storage medium, storing executable instructions, the executable instructions, when executed by a processor of a computer device acting as a blockchain client in a blockchain system, the blockchain system comprising an identity chain and a plurality of application chains, the identity chain being configured to provide an identity service for blockchain applications deployed on the application chains, causing the computer device to perform a data processing method including:

transmitting an identity query request used for querying node identity information to an identity chain node associated with the identity chain, the identity query request comprising an identity identifier (ID) of the blockchain client and a data ID of to-be-processed data;

receiving the node identity information corresponding to the identity ID and the data ID returned by the identity chain node;

determining, within a blockchain node set, a target blockchain node corresponding to the node identity information;

transmitting the data ID to the target blockchain node, to query data on at least one of the plurality of application chains based on the data ID through the target blockchain node; and receiving the queried data returned by the target blockchain node.

16. The non-transitory computer-readable storage medium according to claim 15, wherein there is a mapping relationship between the identity chain node and an identity chain, the identity chain stores identity information of the blockchain client and node identity information of each blockchain node, and the identity information of the blockchain client comprises at least the identity ID; and there is a mapping relationship between a blockchain node in the blockchain node set and at least one application chain, the application chain stores blockchain data, and the identity chain is configured to provide an identity service for a blockchain application deployed on the application chain.

17. The non-transitory computer-readable storage medium according to claim 15, wherein the method further comprises:

transmitting an identity registration request to the identity chain node;

receiving a service address returned by the identity chain node in response to the identity registration request;

transmitting identity registration information of the blockchain client to an identity registration node corresponding to the service address; and receiving, after the identity registration node completes identity registration for the blockchain client based on the identity registration information, the identity ID returned by an identity registration service.

18. The non-transitory computer-readable storage medium according to claim 15, wherein the data ID comprises to-be-queried data; the target blockchain node comprises at least an intermediate node and a processing node;

the transmitting the data ID to the target blockchain node, to process the data through the target blockchain node comprises:

transmitting, when it is determined that the to-be-queried data is stored on an application chain corresponding to the processing node, an ID of the to-be-queried data and an ID of the processing node to the intermediate node, to query the to-be-queried data from the application chain corresponding to the processing node through the intermediate node, and obtain queried data; and the method further comprises: receiving the queried data returned by the intermediate node.

19. The non-transitory computer-readable storage medium according to claim 15, wherein the target blockchain node comprises at least an intermediate node and a processing node; the method further comprises:

transmitting the data ID of the data and an ID of the processing node to the intermediate node, the processing node being a node corresponding to an application chain storing the data;

transmitting the identity ID of the blockchain client and the ID of the processing node to the identity chain node through the intermediate node;

performing identity verification on the blockchain client and the processing node through the identity chain node;

receiving, when the blockchain client and the processing node pass the identity verification, a service address of the processing node transmitted by the identity chain node; and transmitting, according to the service address, the data ID to the processing node, to process the data through the processing node.

20. The non-transitory computer-readable storage medium according to claim 15, wherein the target blockchain node comprises a notary node and a data processing node; and the transmitting the data ID to the target blockchain node, to process the data through the target blockchain node comprises:

transmitting the data ID to the notary node, and transmitting, by the notary node, a proposal corresponding to the data to the data processing node and obtaining a simulation execution result returned by the data processing node after simulating and executing the proposal, so that the notary node submits the data ID of the data to the data processing node based on the simulation execution result.

* * * * *